US011405556B2

(12) United States Patent
Takeuchi

(10) Patent No.: US 11,405,556 B2
(45) Date of Patent: Aug. 2, 2022

(54) PROCESSING DEVICE FOR PROCESSING SHAKE DETECTION SIGNAL AND CONTROL METHOD THEREFOR

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 16/685,288

(22) Filed: Nov. 15, 2019

(65) Prior Publication Data

US 2020/0177816 A1 Jun. 4, 2020

(30) Foreign Application Priority Data

Dec. 4, 2018 (JP) .............................. JP2018-227345

(51) Int. Cl.
*H04N 5/232* (2006.01)

(52) U.S. Cl.
CPC ..... *H04N 5/23287* (2013.01); *H04N 5/23209* (2013.01); *H04N 5/23251* (2013.01); *H04N 5/23293* (2013.01)

(58) Field of Classification Search
None
See application file for complete search history.

(56) References Cited

U.S. PATENT DOCUMENTS 8,023,809 B2 * 9/2011 Washisu ................ G03B 17/00
396/55
8,155,512 B2 * 4/2012 Honjo .................... G03B 17/14
396/55
(Continued)

FOREIGN PATENT DOCUMENTS

CN 101630108 1/2010
CN 102854701 A 1/2013
(Continued)

OTHER PUBLICATIONS

The above patent document was cited in a European Search Report dated May 12, 2020, a copy of which is enclosed, that issued in the corresponding European Patent Application No. 19207355.9.

(Continued)

*Primary Examiner* — Cynthia Segura
(74) *Attorney, Agent, or Firm* — Cowan, Liebowitz & Latman, P.C.

(57) ABSTRACT

A signal processing device includes an acquisition unit configured to acquire a first shake detection signal indicating a detection result of a lens shake detection unit included in an interchangeable lens and a second shake detection signal indicating a detection result of a camera shake detection unit included in a body unit and a determination unit configured to determine a correction amount which is used to correct the first shake detection signal based on the first shake detection signal and the second shake detection signal. The determination unit changes a process parameter for determining the correction amount in accordance with information regarding the camera shake detection unit or information regarding the second shake detection signal. The process parameter includes at least one of a restriction frequency and a gain for the correction amount.

15 Claims, 17 Drawing Sheets

(56) References Cited

U.S. PATENT DOCUMENTS

| | | | |
|---|---|---|---|
| 9,204,046 | B2 | 12/2015 | Ohara |
| 9,613,430 | B2 | 4/2017 | Tsuchiya |
| 9,692,976 | B2 * | 6/2017 | Sakurai ................ G02B 27/646 |
| 10,805,541 | B2 * | 10/2020 | Takayanagi ........... H04N 5/2254 |
| 2010/0123787 | A1 | 5/2010 | Yamanaka |
| 2010/0194897 | A1 * | 8/2010 | Yumiki .................. G03B 7/097 |
| | | | 348/208.4 |
| 2013/0004150 | A1 * | 1/2013 | Wakamatsu ....... H04N 5/23258 |
| | | | 396/55 |
| 2017/0302854 | A1 | 10/2017 | Noguchi |
| 2018/0041705 | A1 * | 2/2018 | Wakamatsu ....... H04N 5/23287 |
| 2018/0255223 | A1 * | 9/2018 | Ichihara ............. H04N 5/23245 |
| 2018/0309932 | A1 * | 10/2018 | Nadamoto ......... H04N 5/23287 |
| 2019/0007617 | A1 * | 1/2019 | Kitagawa ................. G06T 7/70 |
| 2019/0246039 | A1 * | 8/2019 | Takeuchi ............ G02B 27/646 |
| 2020/0154051 | A1 * | 5/2020 | Takeuchi ............... G02B 7/028 |
| 2021/0120162 | A1 * | 4/2021 | Tanaka ............... H04N 5/23287 |

FOREIGN PATENT DOCUMENTS

| | | |
|---|---|---|
| CN | 104081756 A | 10/2014 |
| CN | 104345517 A | 2/2015 |
| CN | 105704364 A | 6/2016 |
| JP | 2007-052235 A | 3/2007 |
| JP | 2015-194711 A | 11/2015 |
| JP | 2016-114792 A | 6/2016 |

OTHER PUBLICATIONS

The above documents were cited in a Jun. 3, 2021 Chinese Office Action, a copy of which is enclosed with an English Translation, that issued in Chinese Patent Application No. 201911227796.3.
The above documents were cited in a Dec. 22, 2021 Chinese Office Action, a copy of which is enclosed with an English Translation, that issued in Chinese Patent Application No. 201911227796.3.

* cited by examiner

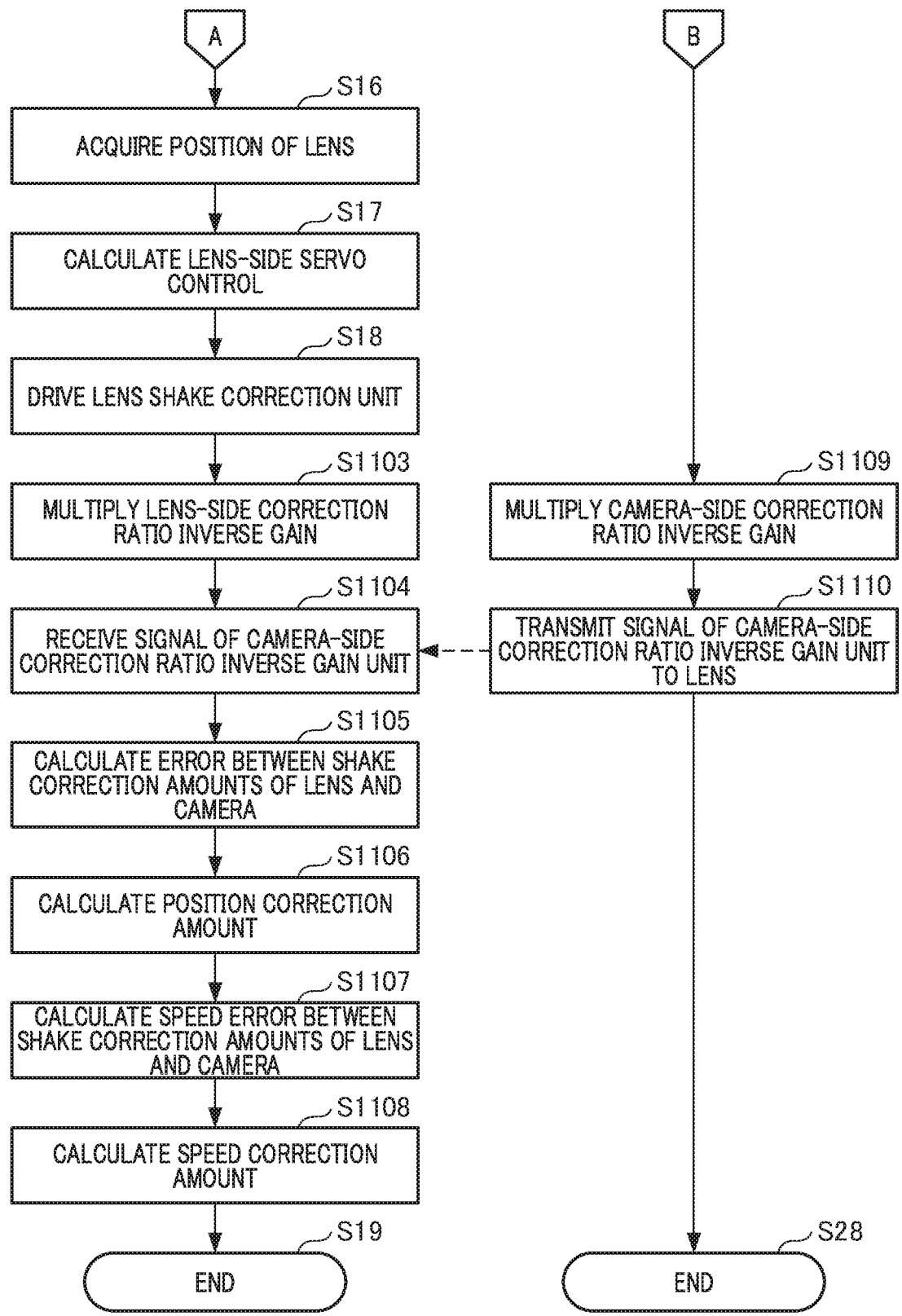

PROCESSING DEVICE FOR PROCESSING SHAKE DETECTION SIGNAL AND CONTROL METHOD THEREFOR

BACKGROUND OF THE INVENTION

Field of the Invention

The present invention relates to image blur correction of an imaging system including a plurality of shake detection units.

Description of the Related Art

An image blur correction function that an optical device such as a video camera, a digital still camera, and an interchangeable lens has is a function of correcting image blur of an image occurring due to camera shake or the like. In the case of a lens interchangeable camera, a shake detection unit and an image blur correction unit are installed in at least one of an interchangeable lens and a camera body unit.

Japanese Unexamined Patent Publication No. 2015-194711 discloses an imaging device including a mechanism that performs image blur correction by moving a correction lens inside an imaging optical system and a mechanism that moves an image sensor in a surface orthogonal to an optical axis. A blur correction amount is calculated from an output of a blur detection unit provided in an interchangeable lens or a camera body. One of a lens driving unit and an element driving unit performs image blur correction based on a blur correction amount of a high-frequency region and the other performs image blur correction based on a blur correction amount of a low-frequency region.

Japanese Unexamined Patent Publication No. 2007-52235 discloses a camera system in which both an imaging lens and a camera body include a shake correction member and a shake detection unit. During an operation of a driving mechanism inside the camera body, a blur correction mechanism is controlled based on an output of an angular velocity sensor inside an imaging lens. During an operation of a driving mechanism inside the imaging lens, the blur correction mechanism is controlled based on an output of an angular velocity sensor inside the camera body.

In a camera system disclosed in Japanese Unexamined Patent Publication No. 2016-114792, both a lens and a body include a blur amount detection unit and a blur correction unit. A process of subtracting a standard value from a blur amount detected by each blur amount detection unit and then correcting the standard value based on a difference between average values of both blur amounts obtained by subtracting the standard value of blur amounts during a predetermined period is performed.

In a lens interchangeable camera system, there is concern of a performance difference between shake detection units included in both the interchangeable lens and the camera body unit affecting image blur correction performance. In an apparatus disclosed in Japanese Unexamined Patent Publication No. 2015-194711, for example, there is a restriction in terms of design since it is necessary to perform determination so that time delay due to communication between the interchangeable lens and the camera body unit is suppressed in relation to a cutoff frequency of a lowpass filter separating a shake correction target value into a low frequency and a high frequency. In an apparatus disclosed in Japanese Unexamined Patent Publication No. 2007-52235, when there is a performance difference between a plurality of shake detection units, there is a possibility of image blur correction performance deteriorating if a plurality of shake correction members are not driven at a constant correction ratio. In an apparatus disclosed in Japanese Unexamined Patent Publication No. 2016-114792, when high-frequency noise or phase shift occurs in a plurality of blur detection signals, a standard value for the blur detection signals may not be accurately obtained. When it takes time to calculate the standard value, correction is performed in accordance with a correction amount based on an inaccurate standard signal. Therefore, there is a possibility of image blur correction performance deteriorating.

SUMMARY OF THE INVENTION

According to the present invention, it is possible to improve image blur correction performance against an influence of a performance difference between shake detection units included in a lens device and an imaging device body unit.

According to an embodiment of the present invention, a signal processing device includes: at least one processor and a memory holding a program which makes the processor function as: an acquisition unit configured to acquire a first shake detection signal indicating a detection result of a first shake detection unit included in a first device and a second shake detection signal indicating a detection result of a second shake detection unit included in a second device different from the first device; and a determination unit configured to determine a correction amount which is used to correct the first shake detection signal based on the first shake detection signal and the second shake detection signal. The determination unit changes a process parameter for determining the correction amount in accordance with information regarding the second shake detection unit or information regarding the second shake detection signal, and the process parameter includes at least one of a restriction frequency and a gain for the correction amount.

Further features of the present invention will become apparent from the following description of exemplary embodiments with reference to the attached drawings.

BRIEF DESCRIPTION OF THE DRAWINGS

FIG. 17 is a flowchart illustrating the process continued from FIG. 16.

DESCRIPTION OF THE EMBODIMENTS

Hereinafter, embodiments of the present invention will be described in detail with reference to the drawings. In each embodiment, a lens interchangeable imaging system capable of capturing a still image or a still image and a moving image will be exemplified. Each of the configurations of the lens control unit 15 and the camera control unit 5 related to the image blur correction may be realized as a signal processing device.

First Embodiment

Figure 1A:
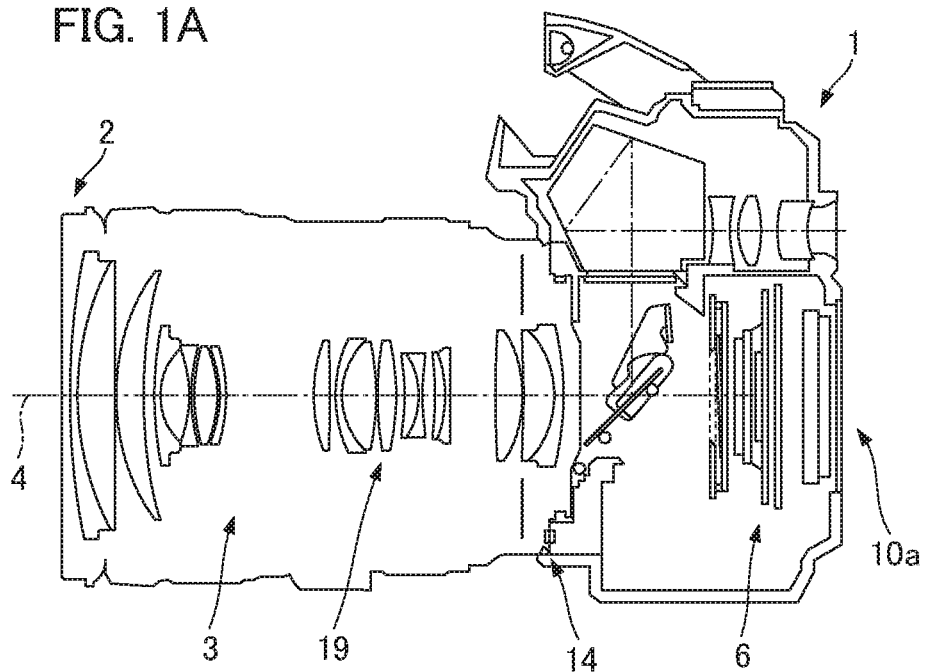
FIGS. 1A and 1B are a central sectional view illustrating an imaging device and a block diagram illustrating an electric configuration of the imaging device.
Figure 1B:
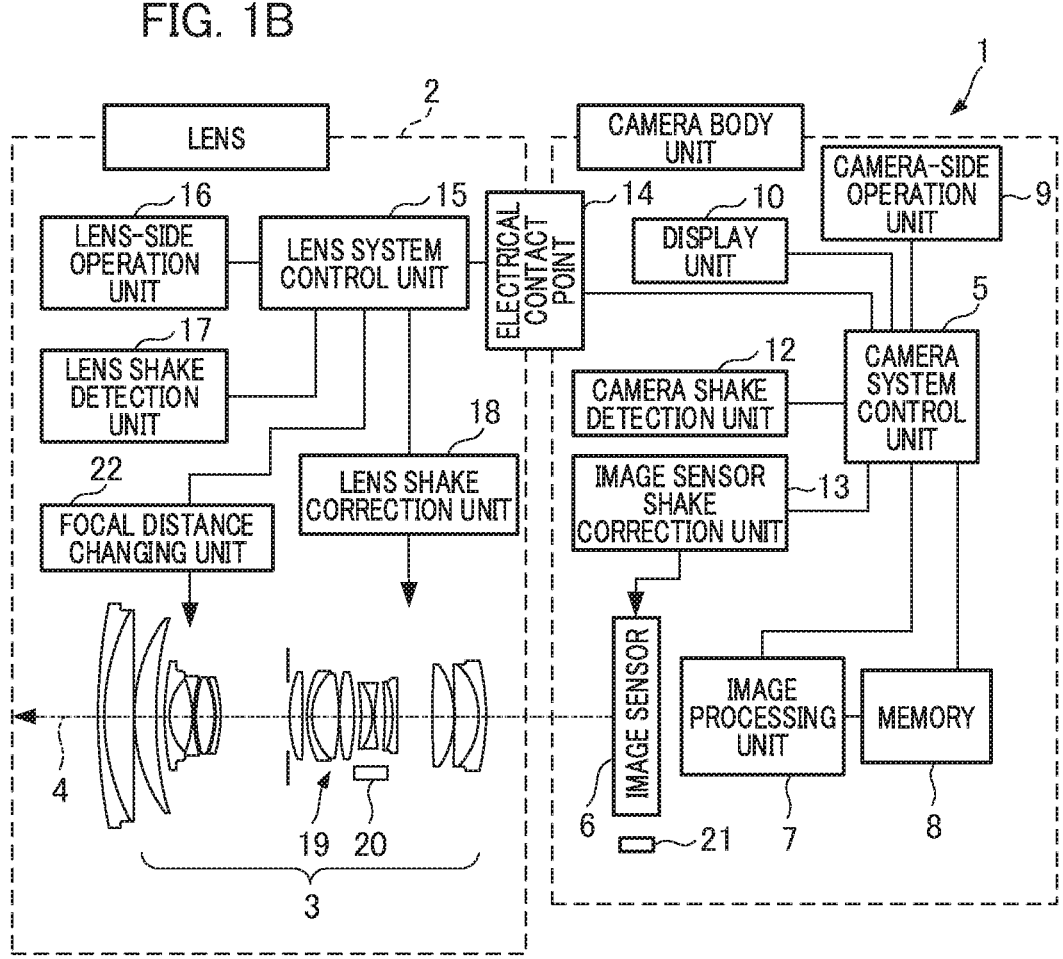

A configuration of an imaging device according to an embodiment of the present invention will be described with reference to FIGS. 1A and 1B. FIG. 1A is a central sectional view illustrating the imaging device according to the embodiment of the present invention. FIG. 1B is a block diagram illustrating an electric configuration of the imaging device.

In the embodiment, an imaging system in Which a lens device can be mounted on a body unit of an imaging device 1 will be described. A user can image a subject in a state in which an interchangeable lens 2 is mounted on the body unit of the imaging device 1. An imaging optical system 3 includes optical members such as a plurality of lenses and diaphragms and an optical axis 4 of the imaging optical system is indicated by a one-dot chain line. An image blur correction lens unit 19 provided in an interchangeable lens 2 includes a correction lens (a shift lens or the like) that corrects image blur occurring due to camera shake or the like and performs driving control so that a motion such as camera shake is cancelled. The interchangeable lens 2 is electrically connected to the body unit of the imaging device 1 by an electrical contact point 14.

An imaging device body unit (hereinafter simply referred to as a body unit) includes an image sensor 6 and a rear-surface display device 10a. The body unit can process data of an image of a subject captured by the image sensor 6 via the imaging optical system 3 and display the captured image on a screen of the rear-surface display device 10a.

Configurations of the body unit and the interchangeable lens 2 will be described with reference to FIG. 1B. First, the body unit includes a camera system control unit 5 that performs general control of the imaging system. The camera system control unit (hereinafter referred to as a camera control unit) 5 includes a central processing unit (CPU) and performs various processes by receiving operation instruction signals of a camera-side operation unit 9 and causing the CPU to execute programs stored in a memory 8. An image processing unit 7 performs image processing on an image signal acquired by the image sensor 6 and stores data subjected to the image processing in the memory 8.

The image processing unit 7 includes an A/D converter, a white balance adjustment circuit, a gamma correction circuit, and an interpolation calculation circuit therein and generates image data for recording. For example, the image processing unit 7 performs a color interpolation (demosaicing) process to generate a color image from a signal with a Bayer array. The image processing unit 7 performs data compression on an image, a moving image, a sound, or the like by a method determined in advance.

The memory 8 outputs image data stored in accordance with a control instruction of the camera control unit 5 to record the image data on a recording medium (not illustrated) and is used for a process of outputting display data to the display unit 10. The display unit 10 displays an image on a screen in accordance with the display data to present the image to the user.

A camera shake detection unit 12 includes an angular velocity sensor or the like, detects a shake amount of the body unit, and outputs a detection signal to the camera control unit 5. In addition to the method using a shake detection sensor, there is a method of detecting shake from a captured image using the image sensor 6 and the image processing unit 7. In this case, the image processing unit 7 calculates a motion amount by comparing a plurality of images having different imaging times obtained from the image sensor 6 and generates a shake detection signal.

An image sensor shake correction unit 13 performs image blur correction by driving the image sensor 6 in response to a control instruction of the camera control unit 5. As image blur correction methods, there is a first method of performing driving control on the image blur correction lens unit 19, a second method of performing driving control on a mechanism unit moving the image sensor 6, and a method that combines these. In the second method, for example, a position detection unit 21 detects the position of the image sensor 6 and the shake correction unit 13 performs driving control on the image sensor 6 using a position detection signal.

The interchangeable lens 2 includes a lens system control unit (hereinafter referred to as a lens control unit) 15. The lens control unit 15 includes a CPU and can communicate with the camera control unit 5 via the electrical contact point 14. The lens control unit 15 receives an operation instruction signal of a lens-side operation unit 16 and performs operation control on the interchangeable lens 2.

The lens shake detection unit 17 includes an angular velocity sensor or the like, detects a shake amount of the interchangeable lens 2, and outputs a detection signal to the lens control unit 15. A lens shake correction unit 18 performs image blur correction by driving the image blur correction lens unit 19 in response to a control instruction of the lens control unit 15. At this time, the lens shake correction unit 18 performs image blur correction using a position detection signal of a correction lens by a lens position detection unit 20. A focal distance changing unit 22 performs driving control of a zoom lens in response to a control instruction of the lens control unit 15 and changes an imaging field angle. Focus of the imaging optical system 3 is adjusted through driving control of a focus lens and an exposure amount is controlled through driving control of a diaphragm.

Next, an imaging process, image processing, a recording reproduction process, and various kinds of control in regard to an operation of the imaging system including the body unit and the interchangeable lens 2 will be described. The imaging process is performed using the imaging optical system 3 and the image sensor 6, the lens control unit 15 is in charge of controlling the imaging optical system 3, and the camera control unit 5 is in charge of controlling the image sensor 6 and performs a linked process. Light from a subject is formed on an imaging surface of the image sensor 6 via the imaging optical system 3 and is converted into an electric signal through photoelectric conversion by the image sensor 6. At this time, automatic focus adjustment (AF) or automatic exposure control (AE) of the imaging optical system 3 is performed. Data of a captured image is subjected to image processing by the image processing unit 7 to be stored in the memory 8.

The recording production process is performed using the memory 8 and the display unit 10. The display unit 10 is provided in the rear-surface display device 10a or an upper surface of the body unit, includes a small-sized display panel (not illustrated) or an electrical view finder (EVF) that displays imaging information, and displays an image or various kinds of information. When the rear-surface display device 10a includes a touch panel, the rear-surface display device 10a has both a display function and an operation input function.

The camera control unit 5, the camera shake detection unit 12, the image sensor shake correction unit 13, and the position detection unit 21 in the body unit perform control of image blur correction. In the interchangeable lens 2, the lens control unit 15, the lens shake detection unit 17, the lens shake correction unit 18, and the lens position detection unit 20 perform the control. The camera shake detection unit 12 and the lens shake detection unit 17 perform shake detection using a gyro sensor or the like. The lens shake correction unit 18 corrects image blur by performing shift driving or tilt driving of a correction lens included in an image blur correction lens unit 19 on a flat surface perpendicular to the optical axis 4 by the first method. The shake correction unit 13 of the image sensor corrects image blur by translating a movement member of the image sensor 6 on the flat surface perpendicular to the optical axis 4 or rotating the movement member around the optical axis by the second method.

The camera control unit 5 performs control on the image sensor 6 by generating a timing signal or the like at the time of imaging and performs control related to the imaging process, the image processing, and the recording reproduction process in response to an operation instruction signal. For example, when pressing of a shutter releasing button included in the camera-side operation unit 9 is detected, the camera control unit 5 controls the image sensor 6, the image processing unit 7, the memory 8, and the display unit 10, and the like.

In the control of the optical member of the imaging optical system 3, the camera control unit 5 calculates a focal position or a diaphragm position based on a signal from the image sensor 6 and an operation instruction signal by the camera-side operation unit 9. The camera control unit 5 transmits a control instruction to the lens control unit 15 via the electrical contact point 14, and the lens control unit 15 performs zoom control by the focal distance changing unit 22 and performs driving control of a diaphragm or a focus lens.

Figure 2:
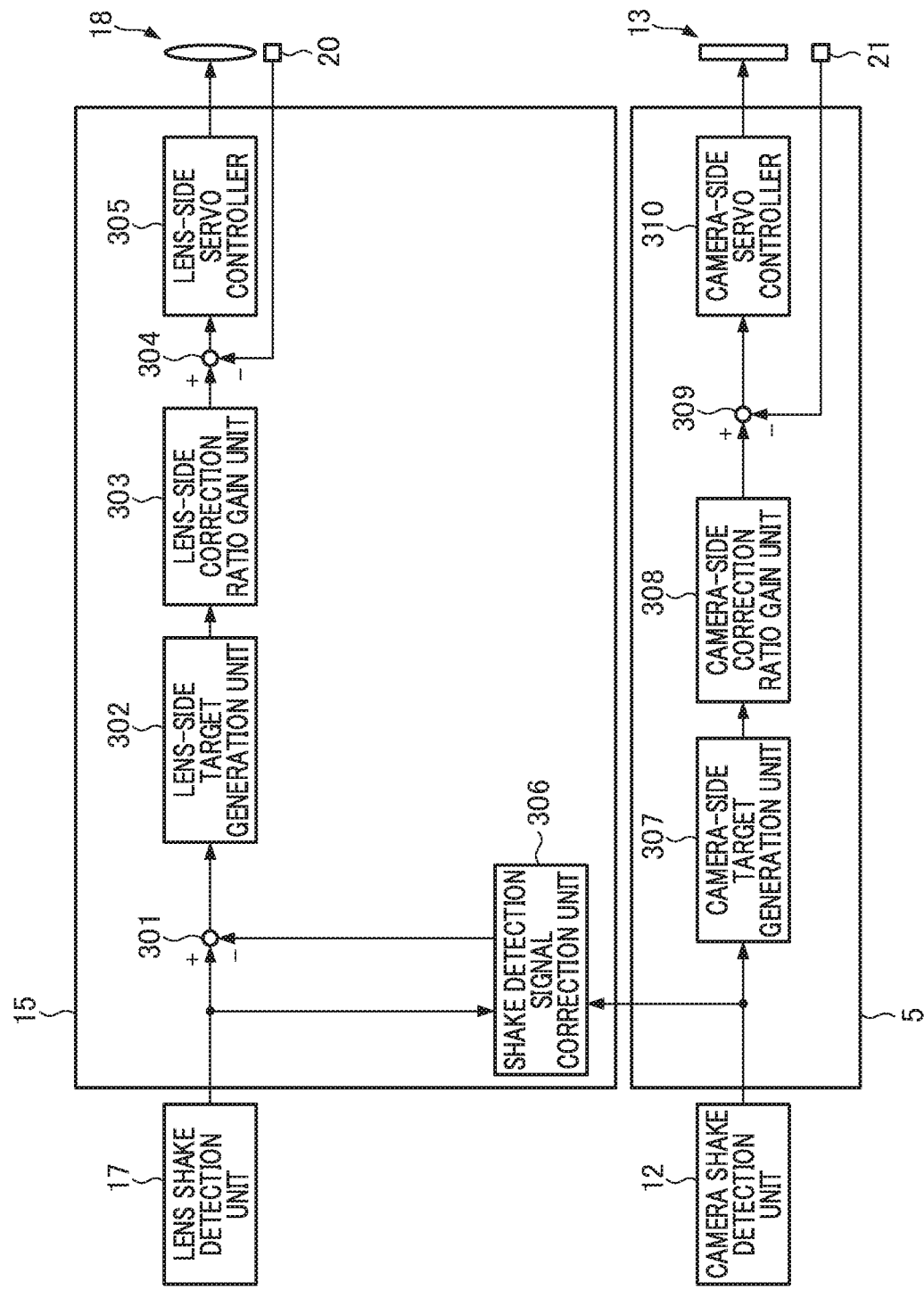
FIG. 2 is a block diagram illustrating a configuration of an image blur correction control unit according to a first embodiment.
Figure 3:
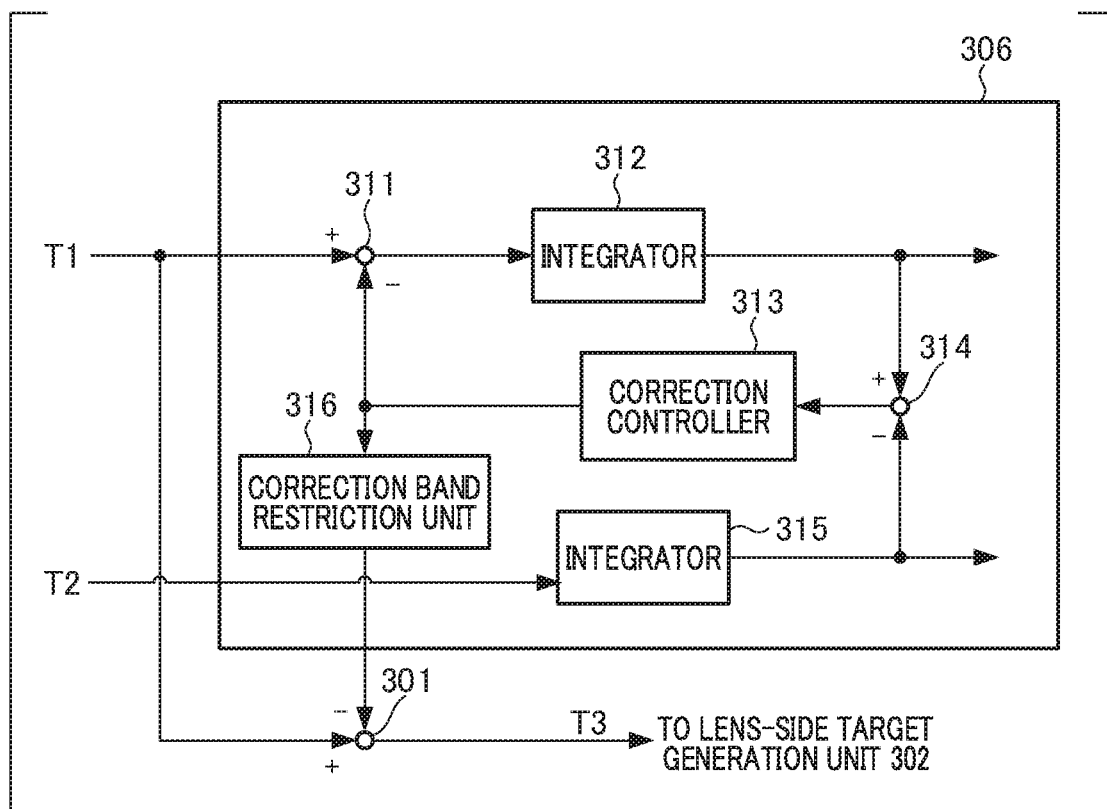
FIG. 3 is a block diagram illustrating a configuration of a correction unit for a shake detection signal according to the first embodiment.

Next, a configuration of a control unit for image blur correction according to the embodiment will be described. FIG. 2 is a block diagram illustrating details of a configuration related to the image blur correction performed by the lens control unit 15 and the camera control unit 5. FIG. 3 is a block diagram illustrating details of an internal configuration of a shake detection signal correction unit 306. Hereinafter, a mode in which a process of correcting blur of an image occurring due to camera shake is performed is referred to an image blur correction mode. In the image blur correction mode, the lens shake correction unit 18 and the image sensor shake correction unit 13 are controlled based on each detection signal by the camera shake detection unit 12 and the lens shake detection unit 17 and each detection signal by the lens position detection unit 20 and the image sensor position detection unit 21. Further, the configuration of the lens control unit 15 and the camera control unit 5 associated related to the image blur correction may be realized as a signal processing device.

In FIG. 2, the lens control unit 15 that acquires and processes a detection signal of the lens shake detection unit 17 includes adders 301 and 304, a lens-side target generation unit 302, a correction ratio gain unit 303, a servo controller 305, and the shake detection signal correction unit 306. The lens control unit 15 acquires a position detection signal from the lens position detection unit 20 and controls the lens shake correction unit 18.

The camera control unit 5 that acquires and processes a detection signal of the camera shake detection unit 12 includes a camera-side target generation unit 307, a correction ratio gain unit 308, an adder 309, and a servo controller 310. The camera control unit 5 acquires a position detection signal from the image sensor position detection unit 21 and controls the image sensor shake correction unit 13. The adder in the present specification will be described in addition to addition calculation in which subtraction is addition of a negative value.

The lens shake correction unit 18 and the image sensor shake correction unit 13 can be realized as, for example, an electronic driving unit using a magnet and a flat coil. The lens position detection unit 20 and the image sensor position detection unit 21 can be realized as, for example, a magnetic detection unit using a magnet and a Hall element.

First, control performed by the lens control unit 15 will be described. The lens control unit 15 acquires a shake detection signal from the lens shake detection unit 17 and the adder 301 subtracts a signal of a correction amount from the shake detection signal. The correction amount calculated by the shake detection signal correction unit 306 will be described later with reference to FIG. 3.

The target generation unit 302 includes an integrator that integrates the corrected shake detection signal output by the adder 301 to calculate a shake correction amount for the lens shake correction unit 18. The correction ratio gain unit 303 multiplies the shake correction amount calculated by the target generation unit 302 by a gain of a predetermined correction ratio. The shake correction amount multiplied by the gain is equivalent to a target value of control performed by the lens control unit 15. The adder 304 subtracts an output of the lens position detection unit 20 from an output of the correction ratio gain unit 303 and outputs a deviation to the servo controller 305.

The servo controller 305 generates a driving signal based on an output of the adder 304 and outputs the driving signal to the lens shake correction unit 18. The driving signal is a signal corresponding to a driving amount used for the lens shake correction unit 18 to drive the image blur correction lens unit 19 based on the shake correction amount. The servo controller 305 is configured as a feedback controller such as a proportional, integral, and derivative (PID) controller.

In this way, the lens control unit 15 calculates a shake component with a predetermined ratio set by the correction ratio gain unit 303 in the shake detection amount detected by the lens shake detection unit 17. The lens shake correction unit 18 drives the image blur correction lens unit 19 in accordance with an instruction value of the driving amount corresponding to the shake component. Image blur is corrected through movement of the correction lens by performing feedback control so that the position of the correction lens detected by the lens position detection unit 20 tracks an instruction value.

Next, control performed by the camera control unit 5 will be described. The camera control unit 5 acquires the shake detection signal from the camera shake detection unit 12 and the target generation unit 307 calculates the shake correction amount. The target generation unit 307 includes an integrator and integrates a shake detection signal to calculate a shake correction amount for the image sensor shake correction unit 13. The correction ratio gain unit 308 multiples the shake correction amount calculated by the target generation unit 307 by a gain of a predetermined correction ratio. The shake correction amount multiplied by the gain is equivalent to a target value of the control performed by the camera control unit 5. The adder 309 subtracts an output of the image sensor position detection unit 21 from the output of the correction ratio gain unit 308 and outputs a deviation to the servo controller 310.

The servo controller 310 generates a driving signal based on the output of the adder 309 and outputs the driving signal to the shake correction unit 13. The driving signal is a signal corresponding to a driving amount used for the shake correction unit 13 to drive the image sensor 6 based on the shake correction amount. The servo controller 310 is configured as a feedback controller such as a PID controller.

In this way, the camera control unit 5 calculates a shake component with a predetermined ratio set by the correction ratio gain unit 308 in the shake correction amount detected by the camera shake detection unit 12. The shake correction unit 13 of the image sensor 6 drives the image sensor 6 in accordance with an instruction value of the driving amount corresponding to the shake component. Image blur is corrected through movement or rotation of the image sensor 6 by performing feedback control so that the position of the image sensor 6 detected by the position detection unit 21 tracks an instruction value.

In the imaging device that has the above-described configuration, driving of the lens shake correction unit 18 and the image sensor shake correction unit 13 is simultaneously controlled based on shake detection information of both of the lens-side and camera (body unit)-side shake detection units 17 and 12. A problem occurring at that time is that an actually detected shake is corrected doubly when the shake correction units 18 and 13 are driven alike based on the shake detection information of the shake detection units 17 and 12. For example, there is a possibility of an image blur correction effect deteriorating due to excessive correction.

Accordingly, in the embodiment, the lens-side correction ratio gain unit 303 and the camera-side correction ratio gain unit 308 determine a sharing ratio of the image blur correction of an actually detected shake amount. That is, a gain set by each of the correction ratio gain units 303 and 308 corresponds to a ratio indicating the degree of a proportion at which each of the shake correction units 18 and 13 performs the image blur correction. For example, a case in which a lens-side correction ratio gain and a camera-side correction ratio gain are each set to 50% will be assumed. In this case, since the shake correction units 18 and 13 each take a share of half of the detected shake amount and perform the image blur correction, 100% of the image blur correction can be performed in simultaneous driving control. Since it is necessary for the shake correction units 18 and 13 to transmit and receive various kinds of information of the lens side and various kinds of information of the body unit side, the body unit serves as a main unit and the interchangeable lens 2 serves as a follower unit to transmit and receive information through communication via the electrical contact point 14.

When the lens shake detection unit 17 and the camera shake detection unit 12 each correctly detect shake of the imaging device alike in the state in which the interchangeable lens 2 is mounted on the body unit, there is no problem. By simultaneously driving the lens shake correction unit 18 and the image sensor shake correction unit 13 at a predetermined ratio using the detection signal, it is possible to perform satisfactory image blur correction. However, in an actual lens interchangeable system, there is a difference in detection performance of the lens shake detection unit 17 and the camera shake detection unit 12 depending on a combination of the interchangeable lens 2 and the body unit in many cases. The difference in the detection performance is, for example, a difference in an output of the same shake in each shake detection unit (sensitivity difference) or a detection performance difference in a low-frequency shake. Specific detection performance is determined from a change in a standard value of the shake detection signal with respect to temperature (temperature drift) which is a characteristic of the angular velocity sensor, a change in a standard value of the shake detection signal in a stationary state (a variation in a low-frequency output), or the like. Alternatively, the detection performance is determined from a change amount of the shake detection signal at a pre-decided time in the stationary state. When there is a detection performance difference between the plurality of shake detection units, a problem arises in that satisfactory image blur correction may not be performed if the image blur correction units are not driven at a pre-decided sharing ratio when the plurality of image blur correction units are simultaneously driven.

In the embodiment, when there is a difference in the detection performance between the shake detection units mounted on the body unit and the interchangeable lens of the imaging device, the correction unit 306 performs a process of correcting the shake detection signal. The correction unit 306 realizes satisfactory image blur correction by correcting the shake detection signal by a shake detection unit with relatively lower detection performance using a shake signal by a shake detection unit with relatively higher detection performance.

The shake detection signal correction unit 306 illustrated in FIG. 3 includes adders 311 and 314, integrators 312 and 315, a correction controller 313, and a correction band restriction unit 316. The correction unit 306 first acquires a shake detection signal (denoted by T1) by the lens shake detection unit 17. The adder 311 outputs a signal obtained by subtracting the correction amount of the shake detection signal calculated by the correction controller 313 to be described below from the shake detection signal by the lens shake detection unit 17 to the first integrator 312. The first integrator 312 calculates a lens shake angle signal through integration calculation and outputs the lens shake angle signal to the adder 314.

Further, the correction unit 306 acquires a camera shake detection signal (denoted by T2) detected by the camera shake detection unit 12. That is, the camera shake detection signal T2 is acquired from the camera control unit 5 through communication via the electrical contact point 14. The second integrator 315 calculates a camera shake angle signal and outputs the camera shake angle signal to the adder 314 by performing integration calculation of the camera shake detection signal. The adder 314 calculates a difference signal equivalent to an angle signal difference of a shake angle by subtracting the camera shake angle signal from the lens shake angle signal and outputs the difference signal to the correction controller 313.

The correction controller 313 acquires the difference signal from the adder 314, calculates a correction amount of the shake detection signal, and then outputs the correction amount to the adder 311 and the correction band restriction unit 316. For the correction amount of the shake detection signal, feedback control is performed through negative feedback of the angle signal difference (difference signal) calculated from the plurality of shake detection signals. The correction controller 313 is a feedback controller that outputs a control signal using the difference signal as an input signal. A known controller can be used as the correction controller 313. For example, a proportional controller and an integral controller are used and can be configured as a feedback controller for PI control.

In the configuration of FIG. 3, the lens shake angle signal calculated from the lens shake detection signal is corrected through the feedback control using the correction controller 313 so that a difference between the lens shake angle signal and the camera shake angle signal calculated from the camera shake detection signal is zero. The correction band restriction unit 316 calculates a correction amount of the shake detection signal obtained by performing frequency band restriction on the correction amount output by the correction controller 313 in the feedback control and outputs the correction amount of the shake detection signal to the adder 301. The correction band restriction unit 316 includes, for example, a lowpass filter (also referred to as an LPF) and extracts a low-frequency component of the signal output by the correction controller 313.

The adder 301 subtracts a signal of the correction amount of the shake detection signal subjected to the band restriction and output by the correction band restriction unit 316 from the lens shake detection signal. Thus, a low-frequency shake signal component of the lens shake detection signal is corrected. The corrected signal (referred to as T3) is input to the lens-side target generation unit 302. The target generation unit 302 calculates a target value of the lens shake correction unit 18 using the lens shake detection signal of which the low-frequency shake signal component is corrected.

Figure 4A:
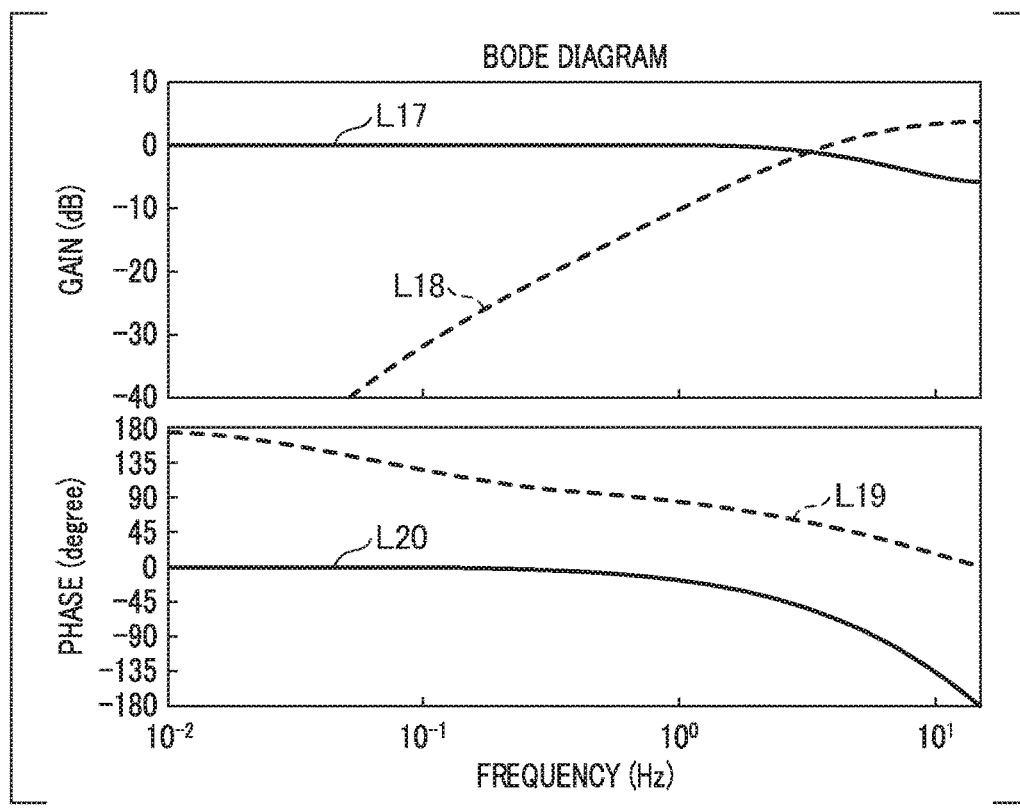
FIGS. 4A and 4B are diagrams illustrating frequency characteristics of a feedback control system according to the first embodiment.

Next, frequency characteristics related to correction of a target value of the lens shake correction unit 18 in accordance with the correction amount of the shake detection signal will be described with reference to the bode diagrams of FIGS. 4A and 4B. FIG. 4A illustrates frequency characteristics determined by the correction band restriction unit 316 and a closed loop system configured by the correction controller 313 in the correction unit 306. The upper diagram illustrates gain characteristics on the horizontal axis (frequency axis) and the lower diagram illustrates phase characteristics on the horizontal axis (frequency axis).

Graph lines L18 and L19 indicated by dotted lines and graph lines L17 and L20 indicated by solid lines in FIG. 4A exemplify transfer characteristics when a gain of the correction controller 313 and a restriction band of the correction band restriction unit 316 are set as a first setting. The graph line L18 represents transfer characteristics (gain characteristics) from the lens shake detection signal T1 in FIG. 3 to the lens shake detection signal output T3 after the low-frequency correction, and the graph line L19 represents transfer characteristics (phase characteristics) from T1 to T3. The graph line L17 represents transfer characteristics (gain characteristics) from the camera shake detection signal T2 in FIG. 3 to the lens shake detection signal output T3 after the low-frequency correction and the graph line L20 represents transfer characteristics (phase characteristics) from T2 to T3.

Figure 4B:
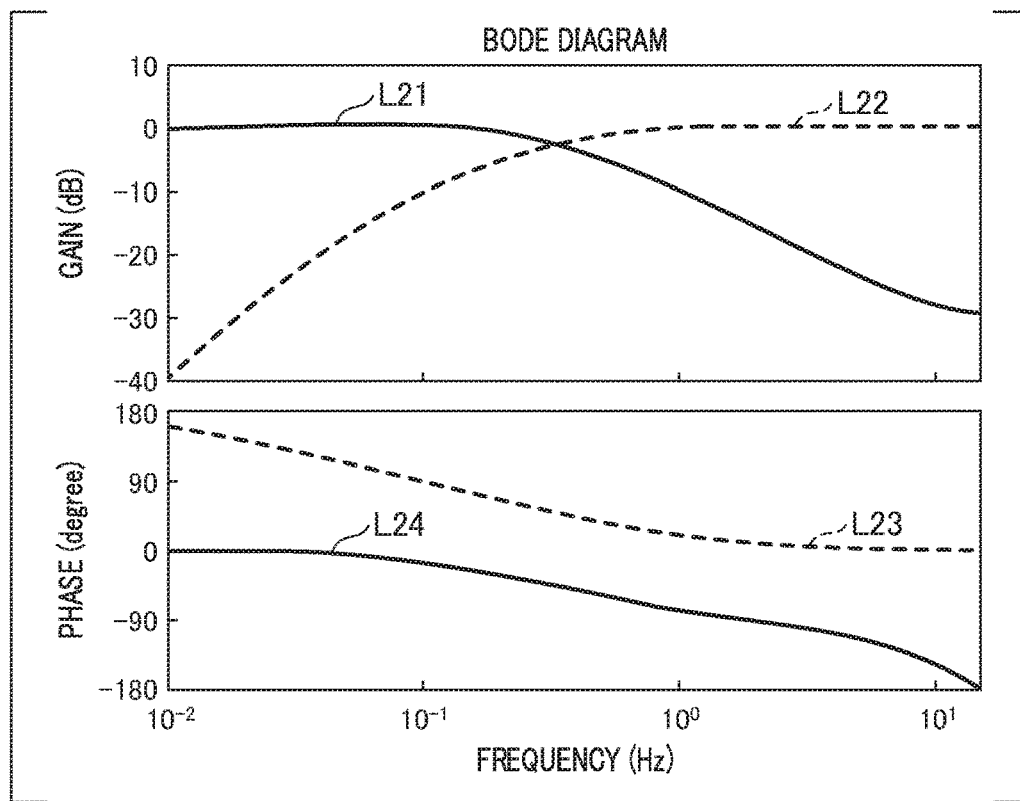

Graph lines L22 and L23 indicated by dotted lines and graph lines L21 and L24 indicated by solid lines in FIG. 4B exemplify transfer characteristics when a gain of the correction controller 313 and a restriction band of the correction hand restriction unit 316 are set as a second setting. The graph line L22 represents transfer characteristics (gain characteristics) from the lens shake detection signal T1 in FIG. 3 to the lens shake detection signal output T3 after the low-frequency correction, and the graph line L23 represents transfer characteristics (phase characteristics) from T1 to T3. The graph line L21 represents transfer characteristics (gain characteristics) from the camera shake detection signal T2 in FIG. 3 to the shake detection signal output T3 after the low-frequency correction and the graph line L24 represents transfer characteristics (phase characteristics) from T2 to T3.

As understood from the gain characteristics represented by the graph lines L17 and L21 indicated by the solid lines in FIGS. 4A and 4B, the transfer characteristics from the camera shake detection signal T2 to the lens shake detection signal output T3 after the low-frequency correction are characteristics close to a lowpass filter. That is, the transfer characteristics are characteristics in which a low-frequency component of the camera shake detection signal T2 is passed and a high-frequency component is cut. As understood from the gain characteristics represented by the graph lines L18 and L22 indicated by the dotted lines in FIGS. 4A and 4B, the transfer characteristics from the lens shake detection signal T1 to the lens shake detection signal output T3 after the low-frequency correction are characteristics close to a highpass filter. That is, the low-frequency component of the lens shake detection signal T1 is cut off and the transfer characteristics are characteristics in which a high-frequency component is passed.

The lens shake detection signal after the low-frequency correction is a signal with which a signal with frequency characteristics from T1 to T3 and from T2 to T3 is combined. Through the combination of these signals, a shake signal in all the frequency bands is reproduced. That is, characteristics of the lens shake detection signal after the low-frequency correction can be expressed through approximation as in Expression (1) below, where K indicates frequency transfer characteristics determined by the correction band restriction unit 316 and the closed loop system configured by the correction controller 313 in the correction unit 306.

$$\text{Lens shake detection signal after low-frequency correction} = (1-K) \times \text{lens shake detection signal} + K \times \text{camera shake detection signal} \quad (1)$$

In the embodiment, a process of separating and combining the high-frequency component of the lens shake detection signal and the low-frequency component of the camera shake detection signal by frequency in accordance with the frequency transfer characteristics K of Expression (1) is performed. The shake detection signal by the lens shake detection unit with relatively lower low-frequency shake detection performance can be corrected using the shake signal by the camera shake detection unit with relatively higher low-frequency shake detection performance. That is, in the embodiment, the low-frequency component of the lens shake detection signal is configured to be supplemented with a low-frequency component of the camera shake detection signal.

Here, as a gain in the correction controller 313 illustrated in FIG. 3 is set to be higher and a cutoff frequency (fc) of an LPF included in the correction band restriction unit 316 is set to be higher, a separation frequency of the high-frequency component of the lens shake detection signal T1 and the low-frequency component of the camera shake detection signal T2 increases. More positively, the camera shake detection signal is used as a low-frequency component of the lens shake detection signal after the low-frequency correction. The first setting illustrated in FIGS. 4A and 4B is a setting in which the gain of the correction controller 313 is set to be higher than that of the second setting and fc of the LPF included in the correction band restriction unit 316 is set to be high.

In the embodiment, by changing the gain of the correction controller 313 and the band of the correction band restriction unit 316, it is possible to dynamically change a ratio of the correction related to the shake detection signal. This ratio indicates a use ratio of the shake detection signal by the shake detection unit with the high low-frequency shake detection performance instead of the shake detection signal by the shake detection unit with the low low-frequency shake detection performance up to some extent of a frequency band. For example, the detection signal by the shake detection unit with the relatively higher low-frequency shake detection performance is the camera shake detection signal, and the detection signal by the shake detection unit with the relatively lower low-frequency shake detection performance is the lens shake detection signal. The height of detection performance is a relative relation between a plurality of shake detection units and does not mean that detection performance of a specific shake detection unit is considerably low.

Figure 5:
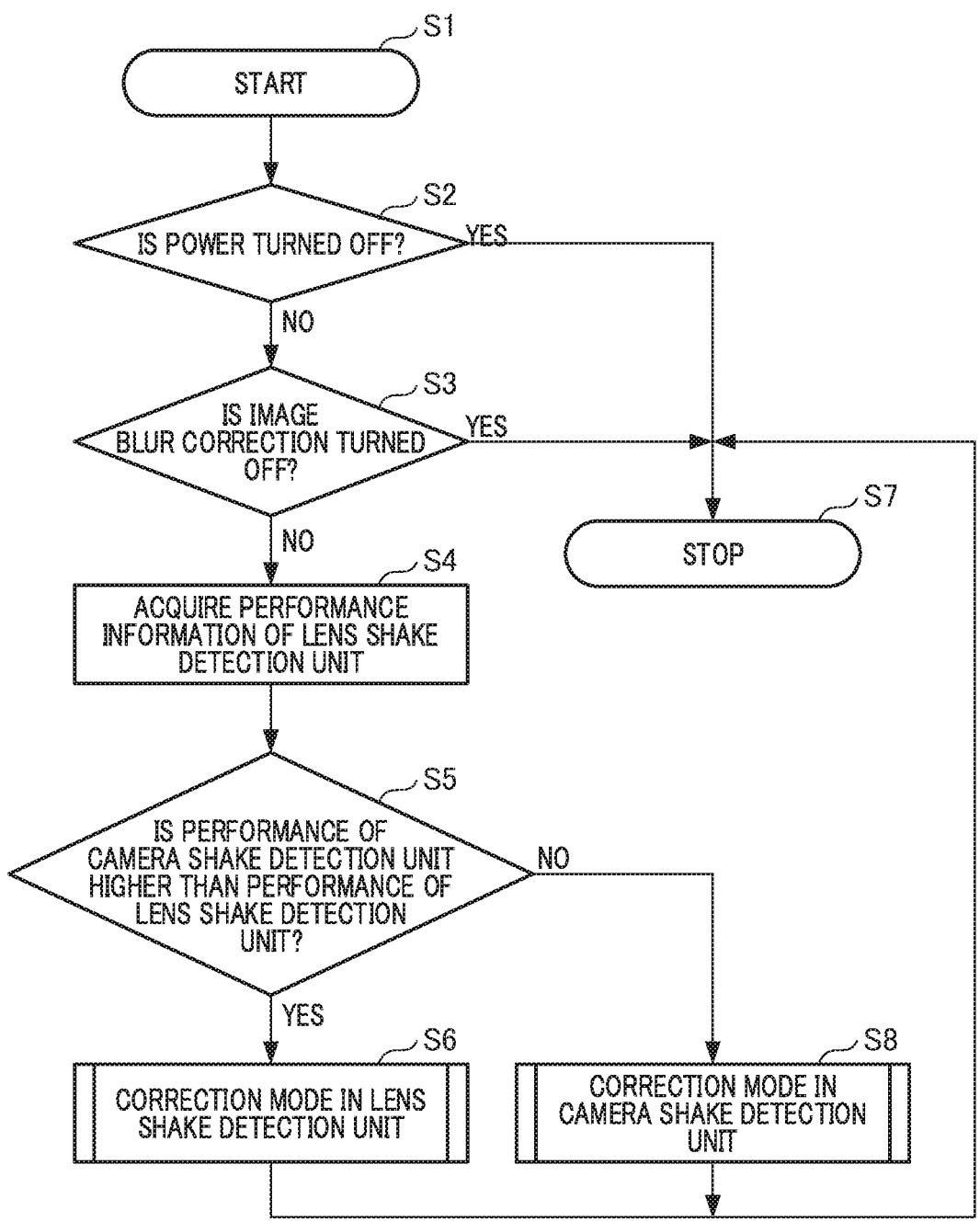
FIG. 5 is a flowchart illustrating a process of determining a correction mode related to a shake detection unit.
Figure 6:
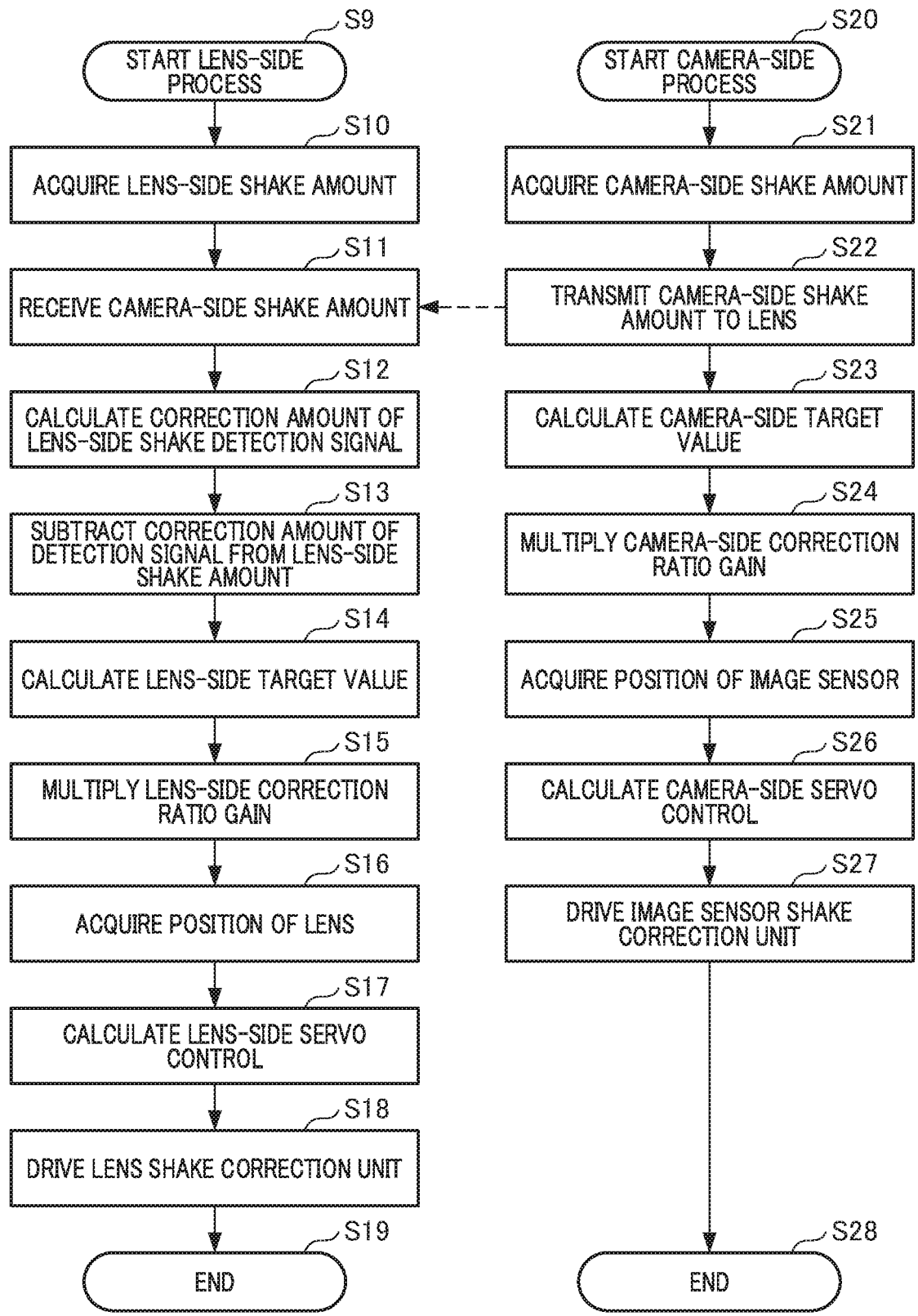
FIG. 6 is a flowchart illustrating image blur correction according to the first embodiment.

Next, an image blur correction process according to the embodiment will be described with reference to FIGS. 5 and 6. FIG. 5 is a flowchart illustrating a process of determining whether to correct a detection signal of the shake detection unit of the interchangeable lens or the detection signal of the shake detection unit of the body unit. FIG. 6 is a flowchart illustrating an image blur correction process by the lens control unit 15 and the camera control unit 5. The lens control unit 15 and the camera control unit 5 perform processes in parallel. Processes from S1 to S8 of FIG. 5, processes from S9 to S19 by the lens control unit 15 in FIG. 6, and processes from S20 to S28 by the camera control unit 5 are performed repeatedly at a predetermined period.

When a process starts in S1 illustrated in FIG. 5, the camera control unit 5 determines in S2 whether the camera-side operation unit 9 performs an operation of feeding power. When a user does not perform the operation of feeding power, the process moves to S7 and an operation stops. When it is determined that the operation of feeding power is performed, the process moves to S3.

Subsequently, in S3, the camera control unit 5 determines whether setting of an image blur correction mode is turned off. When it is determined that the setting of the image blur correction mode is turned off through the user operation of the camera-side operation unit 9, the process moves to S7 and the operation stops. Conversely, when it is determined that the setting of the image blur correction mode is turned on, the process moves to S4.

In S4, the camera control unit 5 acquires detection performance information of the lens shake detection unit 17 from the lens control unit 15. As the detection performance information, for example, information for identifying an angular velocity sensor, such as a model number of the angular velocity sensor, is used in addition to information regarding low-frequency detection performance of shake detection such as temperature drift performance of the angular velocity sensor, low-frequency variation performance, and a standard signal offset amount. Subsequently, in S5, the camera control unit 5 compares performance information of the lens shake detection unit 17 with performance information of the camera shake detection unit 12. When the camera control unit 5 determines that the detection performance of the camera shake detection unit 12 is higher than the detection performance of the lens shake detection unit 17, the process moves to S6. When the camera control unit 5 determines that the detection performance of the lens shake detection unit 17 is higher than the detection performance of the camera shake detection unit 12, the process moves to S8.

In S6, the camera control unit 5 sets a first mode in which a detection signal of the lens shake detection unit 17 is corrected based on the detection signal of the camera shake detection unit 12. In S8, the camera control unit 5 sets a second mode in which the detection signal of the camera shake detection unit 12 is corrected based on the detection signal of the lens shake detection unit 17. The process moves to S6 or S7 after S8 and the operation stops.

In the embodiment, an operation when it is determined that the detection performance of the camera shake detection unit 12 is higher than the detection performance of the lens shake detection unit 17 and the first mode is set in S6 will be described. An operation when the second mode is set in S8 will be described in a second embodiment to be described below.

When the first mode is set in S6, a lens-side operation and a camera-side operation start in S9 and S20 of FIG. 6, respectively. First, an operation of the interchangeable lens 2 will be described. In S10, the lens shake detection unit 17 performs a process of acquiring a lens-side shake amount. Subsequently, in S11, the lens control unit 15 receives a camera-side shake amount transmitted from the camera control unit 5 through communication. The camera-side shake amount is assumed to be already acquired by the camera shake detection unit 12.

In S12, the shake detection signal correction unit 306 calculates a correction amount of the lens-side shake detection signal through the foregoing process. In S13, a process of subtracting the correction amount calculated in S12 from the shake amount detected by the lens shake detection unit 17 is performed. That is, a low-frequency signal component of the lens-side shake detection signal is corrected with the camera-side shake detection signal. Further, in S14, the target generation unit 302 calculates a shake correction amount corresponding to the target value from the shake detection signal of which the low-frequency signal component is corrected.

Subsequently, in S15, the correction ratio gain unit 303 multiplies the output of the target generation unit 302 by the gain corresponding to a correction ratio and used to determine the correction ratio of the lens shake correction unit 18 and outputs the product to the adder 304. In S16, the lens position detection unit 20 acquires positional information of the correction lens. In S17, the adder 304 calculates a difference between the target position of the image blur correction calculated in S15 and the detection position of the correction lens acquired in S16 and the servo controller 305 calculates a feedback control amount corresponding to the difference. In S18, the lens shake correction unit 18 performs image blur correction by moving the correction lens in accordance with the feedback control amount calculated in S17. In S19, the series of processes ends.

On the other hand, the camera-side image blur correction operation is performed from S20 in parallel with the lens-side image blur correction operation. In S21, the camera shake detection unit 12 performs a process of acquiring the camera-side shake amount. Subsequently, in S22, the camera control unit 5 transmits the camera-side shake amount detected in step S21 by the camera shake detection unit 12 to the lens control unit 15. Subsequently, in S23, the camera-side target generation unit 307 calculates a shake correction amount corresponding to the camera-side target value by causing an integrator (not illustrated) to perform an integration process on the detection signal (an angular velocity signal or the like) by the camera shake detection unit 12.

Further, in S24, the correction ratio gain unit 308 multiplies the output of the target generation unit 307 by the gain corresponding to the correction ratio and used to determine the correction ratio of the image sensor shake correction unit 13 and outputs the product to the adder 309, in S25, the position detection unit 21 acquires positional information of the image sensor. In S26, the adder 314 calculates a difference between the target value of the image blur correction calculated in S24 and the detection position of the image sensor 6 acquired in S25 and the servo controller 310 calculates a feedback control amount corresponding to the difference. In S27, the image sensor shake correction unit 13 performs image blur correction by moving the image sensor 6 in accordance with the feedback control amount calculated in S26. In S28 the series of processes ends.

As described above, the image blur correction is performed on the shake amount detected by the shake detection unit included in each of the interchangeable lens 2 and the body unit by simultaneously driving the lens shake correction unit 18 and the image sensor shake correction unit 13 in accordance with the correction ratio.

Figure 7A:
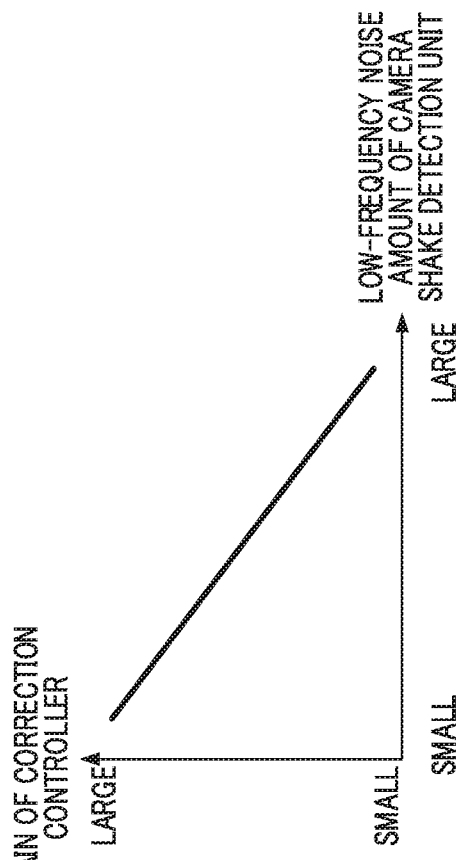
FIGS. 7A to 7D are diagrams illustrating a gain of a correction controller and band setting by a correction band restriction unit.
Figure 7B:
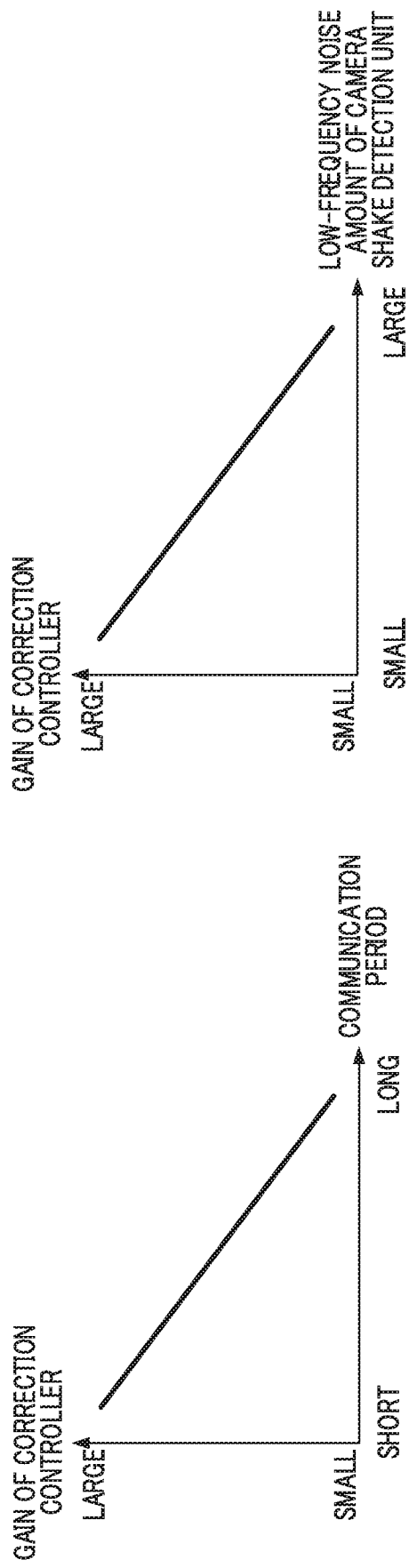

Next, a change in the restriction band of the correction band restriction unit 316 and the gain of the correction controller 313 will be described with reference to FIGS. 7A and 7B. FIG. 7A illustrates a relation between a communication period (communication time interface) between the body unit and the interchangeable lens represented by the horizontal axis and a gain value of the correction controller 313 represented by the vertical axis. FIG. 7B illustrates a relation between the communication period represented by the horizontal axis and the restriction frequency of the correction band restriction unit 316 represented by the vertical axis.

In the embodiment, the camera control unit 5 transmits the camera shake detection signal to the lens control unit 15 through communication via the electrical contact point 14. Therefore, as the communication period is longer, delay of a time occurs in the camera shake detection signal with respect to an actual shake. In the shake detection signal correction unit 306, a phase deviation occurs between the lens shake signal and the camera shake signal due to communication delay when the shake angle signal is generated from the received camera shake detection signal and the lens shake detection signal. An influence of the phase deviation increases as the frequency of the detected shake is higher. Therefore, when the lens shake detection signal is corrected the camera shake detection signal in which the phase deviation occurs up to a higher frequency band, there is a possibility of a detection error occurring in the shake detection signal which is a high frequency. Accordingly, as illustrated in FIG. 7A, control is performed such that a gain of the correction controller 313 decreases as the communication period between the body unit and the interchangeable lens 2 is longer. As illustrated in FIG. 7B, as the communication period is longer, the restriction frequency of the correction band restriction unit 316 is set to be low.

Figure 7C:
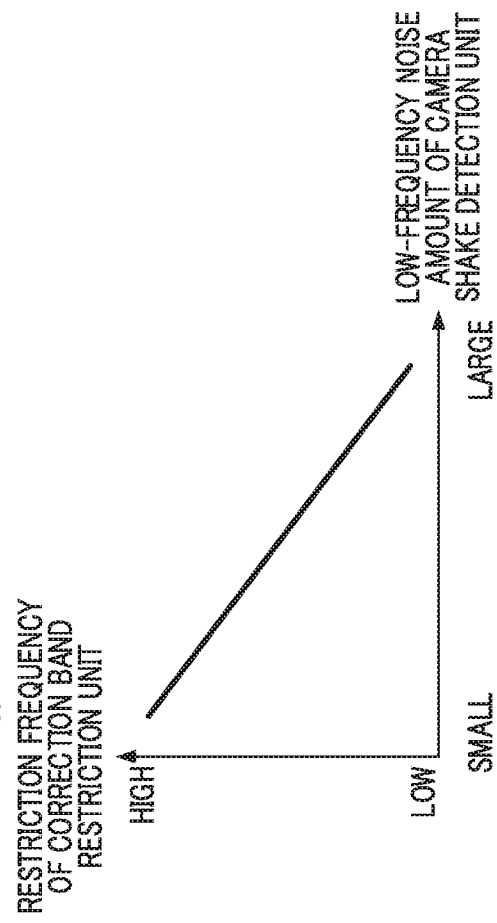
Figure 7D:
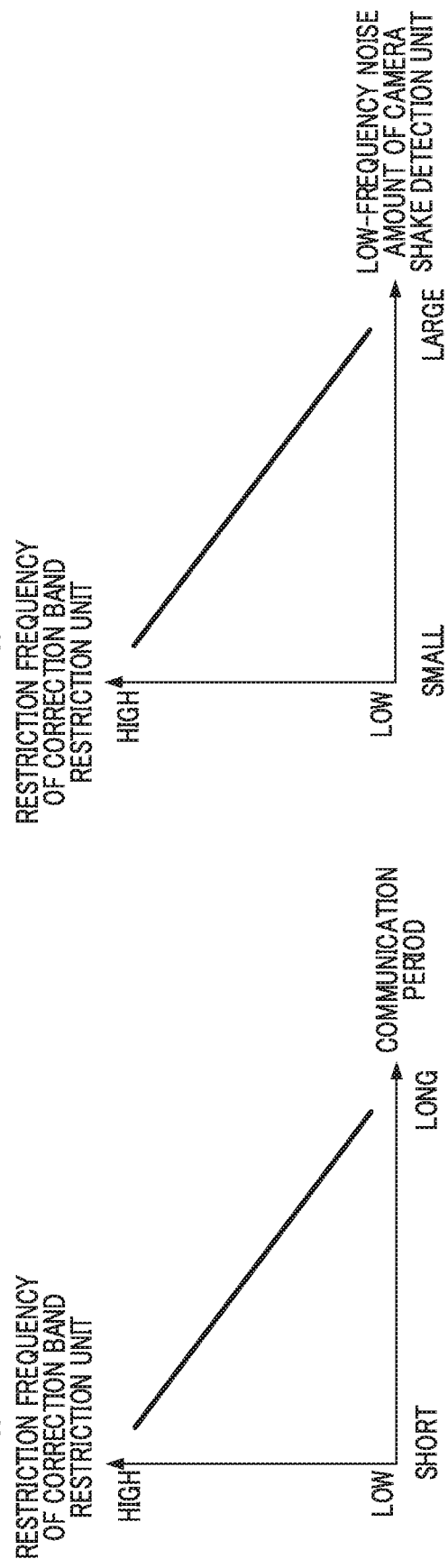

Next, relations between a low-frequency noise amount of the camera shake detection unit 12, and a gain of the correction controller 313 and a band restriction of the correction band restriction unit 316 will be described with reference to FIGS. 7C and 7D. Low-frequency noise is a component such as a drift component, a standard value offset component, or a variation amount. FIG. 7C illustrates a relation between a low-frequency noise amount of the camera shake detection unit 12 represented by the horizontal axis and a gain value of the correction controller 313 represented by the vertical axis. FIG. 7D illustrates a relation between a low-frequency noise amount of the camera shake detection unit 12 represented by the horizontal axis and a restriction frequency of the correction band restriction unit 316 represented by the vertical axis. In the embodiment, the lens shake detection signal by the shake detection unit with low low-frequency shake detection performance is configured to be corrected with the camera shake detection signal by the shake detection unit with high low-frequency shake detection performance. In this case, when a temperature drift of the low frequency or a variation amount of a low frequency increases due to a factor such as an increase in an internal temperature of the camera shake detection unit 12, there is concern of erroneous correction of a low-frequency signal component of the lens shake detection signal. Accordingly, in the embodiment, as illustrated in FIG. 7C, control is performed such that a gain of the correction controller 313 decreases as the low-frequency noise amount of the camera shake detection unit 12 increases. As illustrated in FIG. 7D, the restriction frequency of the correction band restriction unit 316 is set to be lower as the low-frequency noise amount of the camera shake detection unit 12 increases.

Since the control of the gain of the correction controller 313 and the setting of the restriction band of the correction band restriction unit 316 are changed in accordance with each of the above-described conditions, the shake detection performance and further the image blur correction performance can be improved.

Figure 8A:
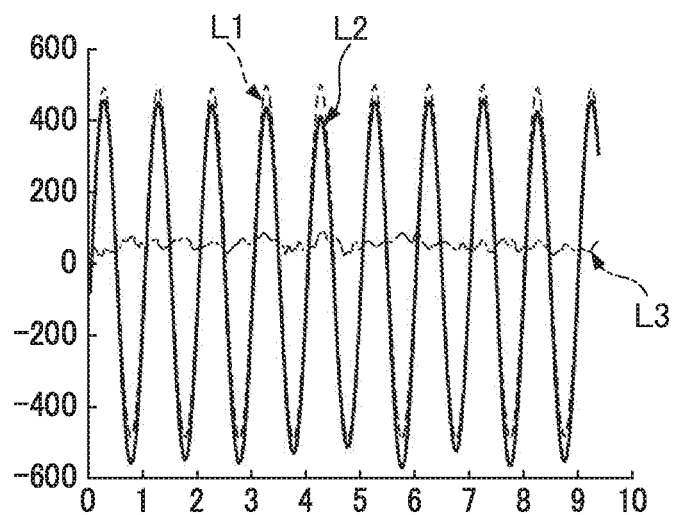
FIGS. 8A to 8C are diagrams illustrating waveform examples at the time of first setting according to the first embodiment.
Figure 8B:
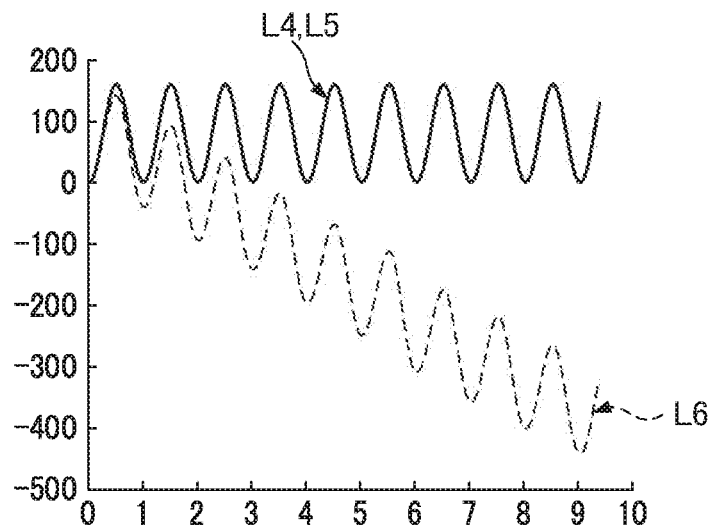
Figure 8C:
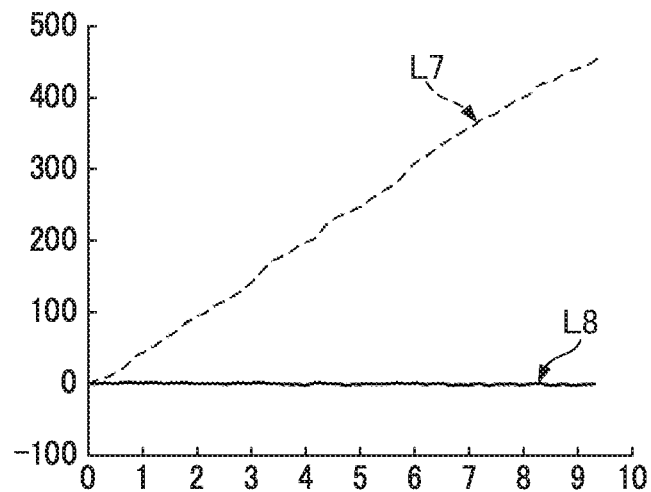
Figure 9A:
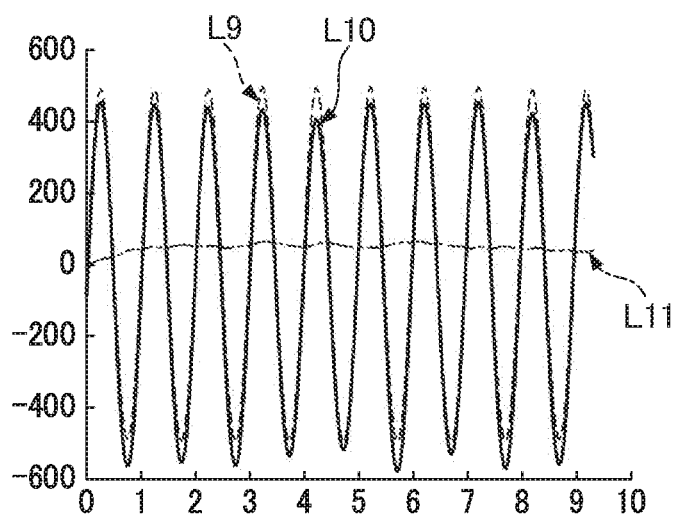
FIGS. 9A to 9C are diagrams illustrating waveform examples at the time of second setting according to the first embodiment.
Figure 9B:
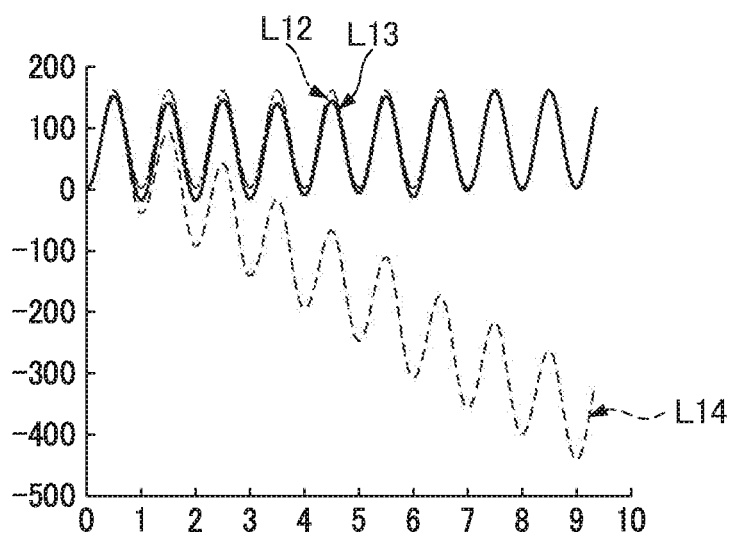
Figure 9C:
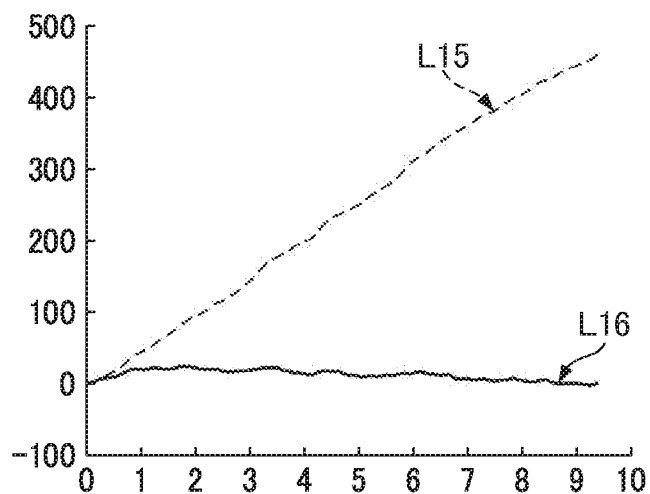

Advantages of the embodiment will be described with reference to FIGS. 8A to 8C and FIGS. 9A and 9C. FIGS. 8A to 8C illustrate an example of a waveform indicating a relation between shake detection information and a correction amount when the gain of the correction controller 313 and the restriction band of the correction band restriction unit 316 are set as the first setting. FIGS. 9A to 9C illustrate an example of a waveform indicating a relation between shake detection information and a correction amount when the gain of the correction controller 313 and the restriction band of the correction band restriction unit 316 are set as the second setting. In the first setting, the closed loop system configured by the correction controller 313 in the correction unit 306 and frequency characteristics determined by the correction band restriction unit 316 correspond to FIG. 4A.

Frequency characteristics in the second setting lower than in the first setting correspond to FIG. 4B. In each drawing, the horizontal axis is a time axis the vertical axis is an amount.

A graph line L1 indicated by a dotted line in FIG. 8A represents a waveform of a shake detection signal detected by the lens shake detection unit 17. A graph line L2 indicated by a solid line represents a waveform of a shake detection signal detected by the camera shake detection unit 12. A graph line L3 indicated by a one-dot chain line represents a correction amount of the shake detection signal calculated by the shake detection signal correction unit 306 in the first setting. The vertical axis represents a digital value of a shake amount expressed as an angular velocity. The shake amount (see L1) related to the lens shake detection signal has an offset of a standard value (a component in which a shake standard value of a waveform deviates in a positive direction from zero) with respect to the shake amount (see L2) related to the camera shake detection signal, and a phase deviates. As understood from the correction amount (see L3) of the shake detection signal calculated by the correction unit 306 in the first setting, a standard offset deviation amount is estimated from time 0. An error amount between phase deviation components of the two waveforms (L1 and L2) is estimated up to a high frequency.

A graph line L4 illustrated in FIG. 8B represents a signal corresponding to a target value (referred to as a target signal) calculated by the lens-side target generation unit 302 from the lens shake detection signal corrected using the correction amount calculated by the shake detection signal correction unit 306. Since the graph line L4 indicated by a one-dot chain line nearly matches a graph line L5 indicated by a solid line, the graph lines mutually overlap. The graph line L5 indicated by the solid line represents a target signal calculated by the camera-side target generation unit 307 from the camera shake detection signal. A graph line L6 indicated by a dotted line represents a target signal calculated by the target generation unit 302 from the lens shake detection signal when correction is not performed using the correction amount calculated by the shake detection signal correction unit 306 (at the time of non-correction). The vertical axis represents a digital value of an angle shake amount. As illustrated in the graph line L6 indicated by a dotted line, a lens-side target signal at the time of non-correction is affected by low-frequency noise included in the lens shake detection signal, and thus a drift occurs due to an integral error inside the target generation unit 302. However, referring to the graph line L4, when correction is performed using the correction amount of the shake detection signal, the low-frequency noise is corrected. Therefore, it can be understood that the lens-side target signal nearly matches the camera-side target signal. That is, a satisfactory correction amount is calculated.

A graph line L7 indicated by a dotted line illustrated in FIG. 8C represents a correction remaining signal which is a difference between an actual shake amount and the lens-side target signal at the time of non-correction. A graph line L8 indicated by a solid line represents a correction remaining signal which is a difference between an actual shake amount and a lens-side target signal when the correction is performed using the correction amount of the shake detection signal. The vertical axis represents a digital value of an angle shake correction remaining amount. Whereas the correction remainder considerably occurs due to an influence of an integral drift error of the target signal in the graph line L7, it can be understood that the correction remainder scarcely occurs in the graph line L8 and the satisfactory image blur correction is performed.

FIGS. 9A to 9C illustrate a case in which the correction amount calculated by the shake detection signal correction unit 306 is used in the second setting. The waveforms (graphs indicated by a solid line, a one-dot chain line, and a dotted line) indicate amounts similar to the physical amounts described in FIGS. 8A and 8C and the graph lines L9 to L16 correspond to L1 to L8 of FIGS. 8A to 8C. Differences in FIGS. 9A to 9C are that a gain of the correction controller 313 is low and a cutoff frequency of the LPF of the correction band restriction unit 316 is low in the case of the second setting than in the first setting. Therefore, a frequency band when a low-frequency signal component of the lens shake detection signal is corrected with the low-frequency signal component of the camera shake detection signal is lowered. Referring to a graph line L16, a low-frequency variation component included in the lens shake detection signal is not entirely removed and a shake correction remainder occurs compared to the time of the first setting.

In the embodiment, the shake detection signal correction unit 306 supplements the low-frequency component of the lens shake detection signal with the low-frequency component of the camera shake detection signal, thereby realizing an improvement in the image blur correction performance. By changing the gain of the correction controller 313 and the band of the correction band restriction unit 316, it is possible to change a ratio of the correction. That is, it is possible to dynamically change a ratio at which it is determined whether the camera shake detection signal is used instead of the lens shake detection signal up to some extent of frequency band. Accordingly, it is possible to improve the image blur correction performance regardless of a noise situation of the shake detection unit.

Modification Example of First Embodiment

A modification example of the first embodiment will be described with reference to FIGS. 10A and 10B. Hereinafter, differences from the first embodiment will be described. The reference numerals and signs used above are given to similar units to those of the first embodiment, and the detailed description will be omitted. The reference numerals and signs used above will be also omitted in embodiments and modification examples to be described below.

In the first embodiment, the configuration of the lens control unit 15 including the shake detection signal correction unit in the image blur correction system that includes the lens shake correction unit 18 and the image sensor shake correction unit 13 and can simultaneously drive the plurality of shake correction members has been described. For application of the present invention, each of the body unit and the lens device of the imaging device may include the shake detection unit and it is not necessary for each of the body unit and the lens device to include the shake correction member. In the modification example, a configuration in which only the lens device includes a shake correction member will be described.

Figure 10A:
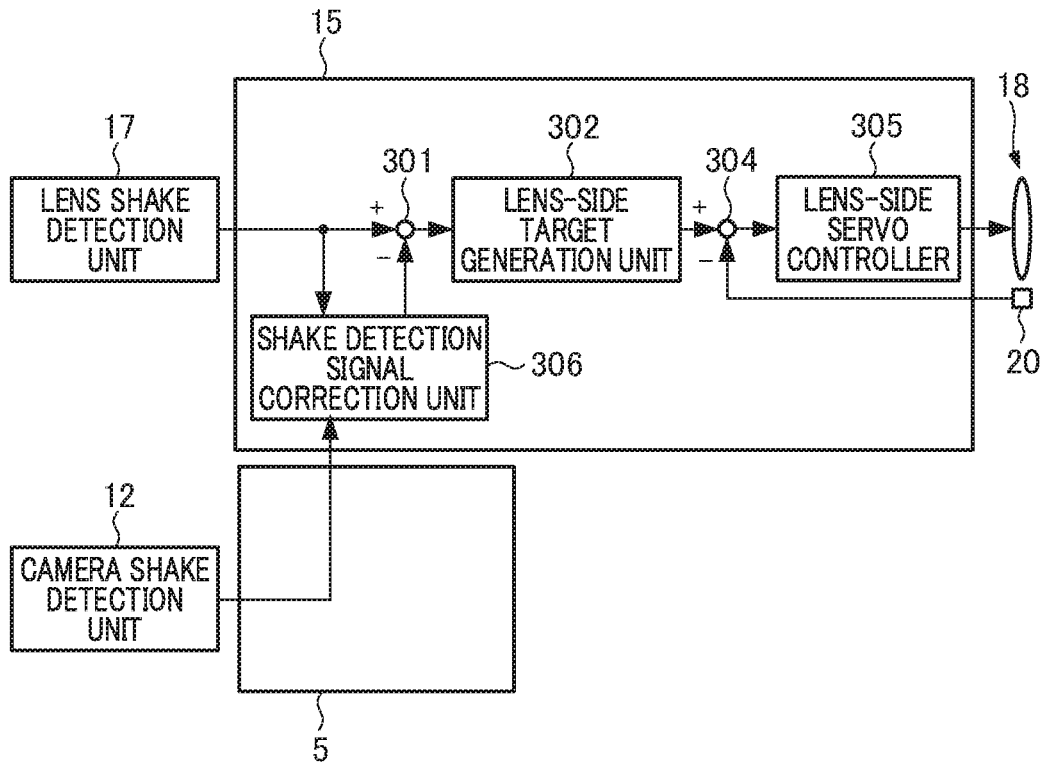
FIGS. 10A and 10E are block diagrams illustrating configurations according to modification examples of the first embodiment.

FIG. 10A is a block diagram illustrating an example in which the interchangeable lens 2 include the lens shake correction unit 18 and the body unit does not include the image sensor shake correction unit 13. The lens control unit 15 includes the shake detection signal correction unit 306 and only the lens shake correction unit 18 performs image blur correction. Accordingly, the lens-side correction ratio gain unit 303 that determines a correction ratio is not provided.

Figure 10B:
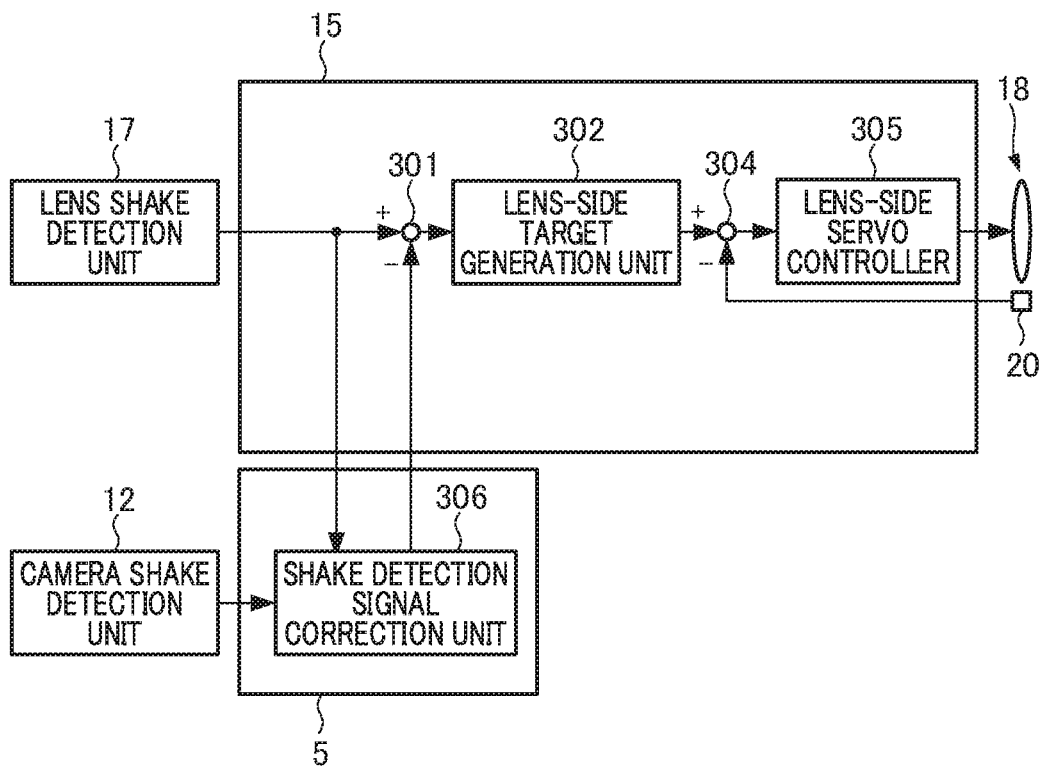

FIG. 10B is a block diagram illustrating an example in which the camera control unit 5 includes the shake detection signal correction unit 306. The point that only the lens shake correction unit 18 performs image blur correction is the same as FIG. 10A, but the lens control unit 15 receives a signal of a correction amount by the shake detection signal correction unit 306 from the camera control unit 5. When there is a restriction on a processing load or a processing capability of the lens control unit 15, the camera control unit 5 may include the correction unit 306. Here, in this configuration, it is necessary for the camera control unit 5 to acquire a lens shake detection signal from the lens control unit 15 through communication, calculate a correction amount of the shake detection signal, and transmit the signal of the correction amount to the lens control unit 15. Therefore, the camera control unit 5 and the lens control unit 15 perform a process of taking countermeasures against an influence of a delay time through communication.

According to the modification example, even when the imaging system including the body unit and the lens device that each include the shake detection unit does not include a plurality of shake correction members, it is possible to improve the image blur correction performance.

Second Embodiment

An imaging device according to an embodiment will be described with reference to FIGS. 11 to 13. In the embodiment, it is determined in S5 of FIG. 5 that the detection performance of the camera shake detection unit 12 is lower than the detection performance of the lens shake detection 17, and the second mode is set in S8. Only differences from the first embodiment will be described.

Figure 11:
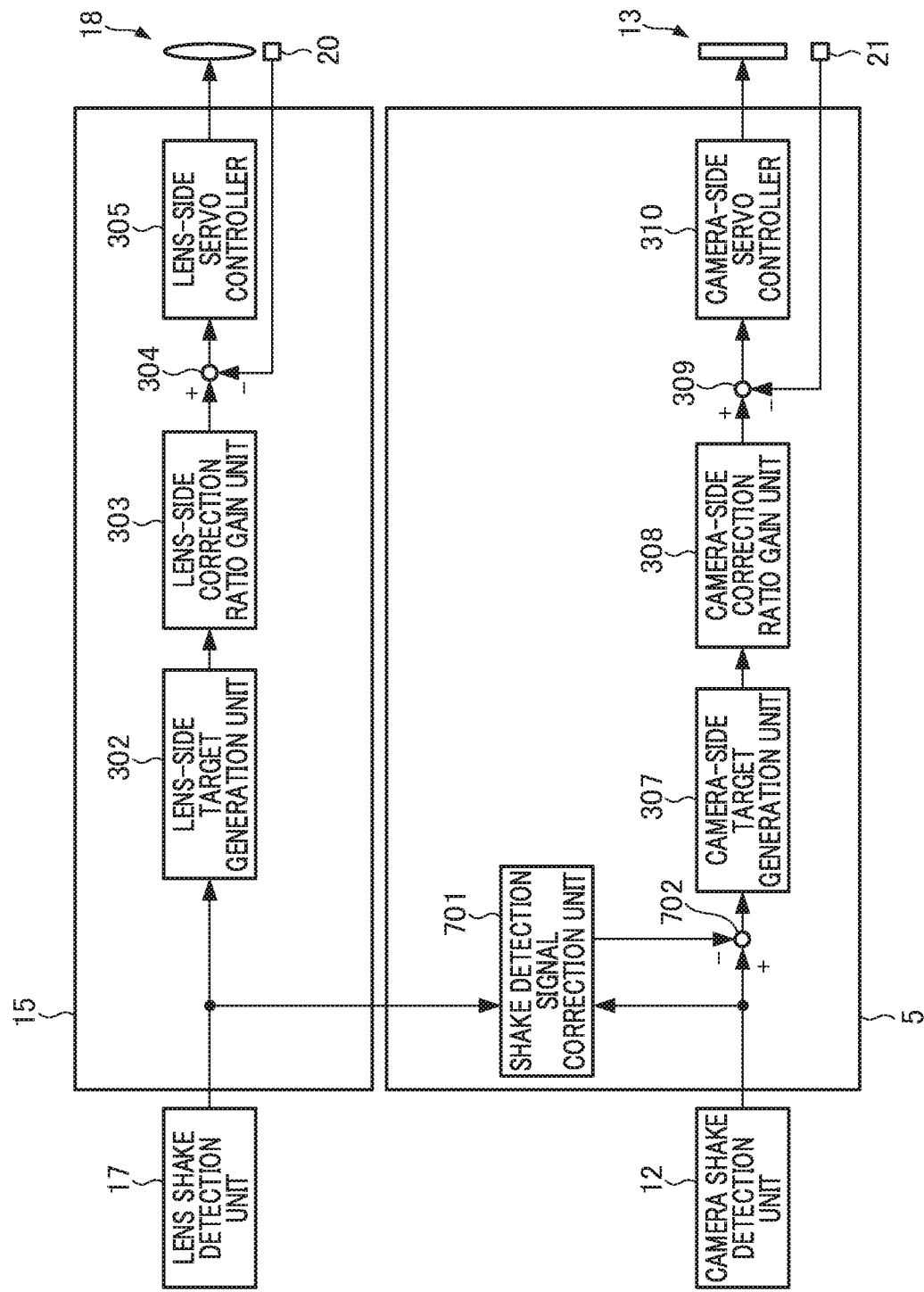
FIG. 11 is a block diagram illustrating a configuration of an image blur correction control unit according to a second embodiment.

FIG. 11 is a block diagram illustrating a configuration of the lens control unit 15 and the camera control unit 5 according to the embodiment. A camera shake detection signal is corrected based on a lens shake detection signal. That is, the camera control unit 5 includes a shake detection signal correction unit 701, and an adder 702 subtracts a correction amount of a shake detection signal calculated by the correction unit 701 from the camera shake detection signal. The target generation unit 307 calculates a target signal of the image sensor shake correction unit 13 from the corrected camera shake detection signal which is an output of the adder 702 and outputs the target signal to the correction ratio gain unit 308. Each of the configurations of the lens control unit 15 and the camera control unit 5 related to the image blur correction may be realized as a signal processing device.

Figure 12:
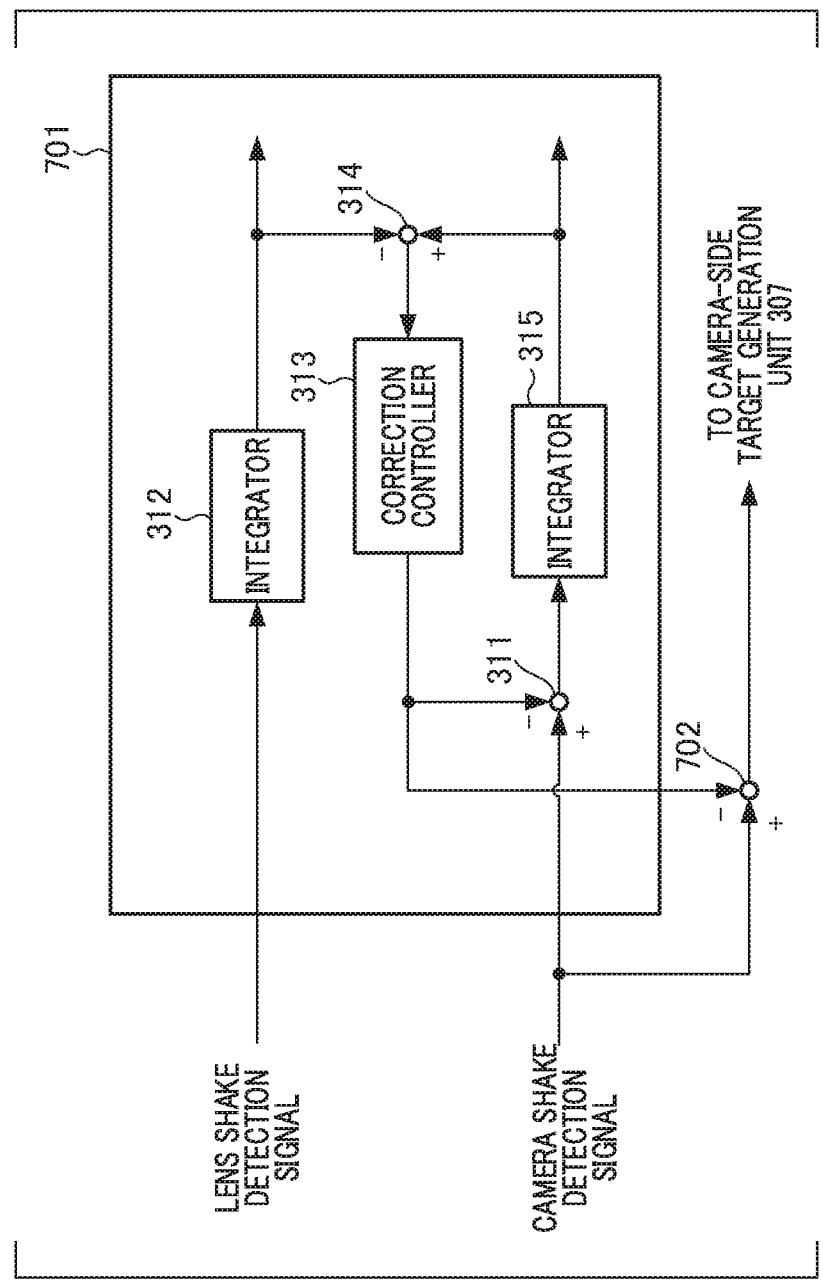
FIG. 12 is a block diagram illustrating a configuration of a correction unit for a shake detection signal according to the second embodiment.

FIG. 12 is a block diagram illustrating a configuration of the shake detection signal correction unit 701. The first integrator 312 performs a process of integrating the lens shake detection signal and outputs an integration result to the adder 314. The correction controller 313 acquires an output of the adder 314 and calculates a correction amount. An output of the correction controller 313 is transmitted to each of the adders 311 and 702. The adder 311 subtracts the output of the correction controller 313 from the camera shake detection signal and outputs a subtraction result to the second integrator 315. The second integrator 315 performs a process of integrating the output of the adder 311 and outputs an integration result to the adder 314. The adder 314 subtracts the output of the first integrator 312 from the output of the second integrator 315 and outputs a subtraction result to the correction controller 313. The adder 702 subtracts the output of the correction controller 313 from the camera shake detection signal and outputs a subtraction result to the target generation unit 307.

Figure 13:
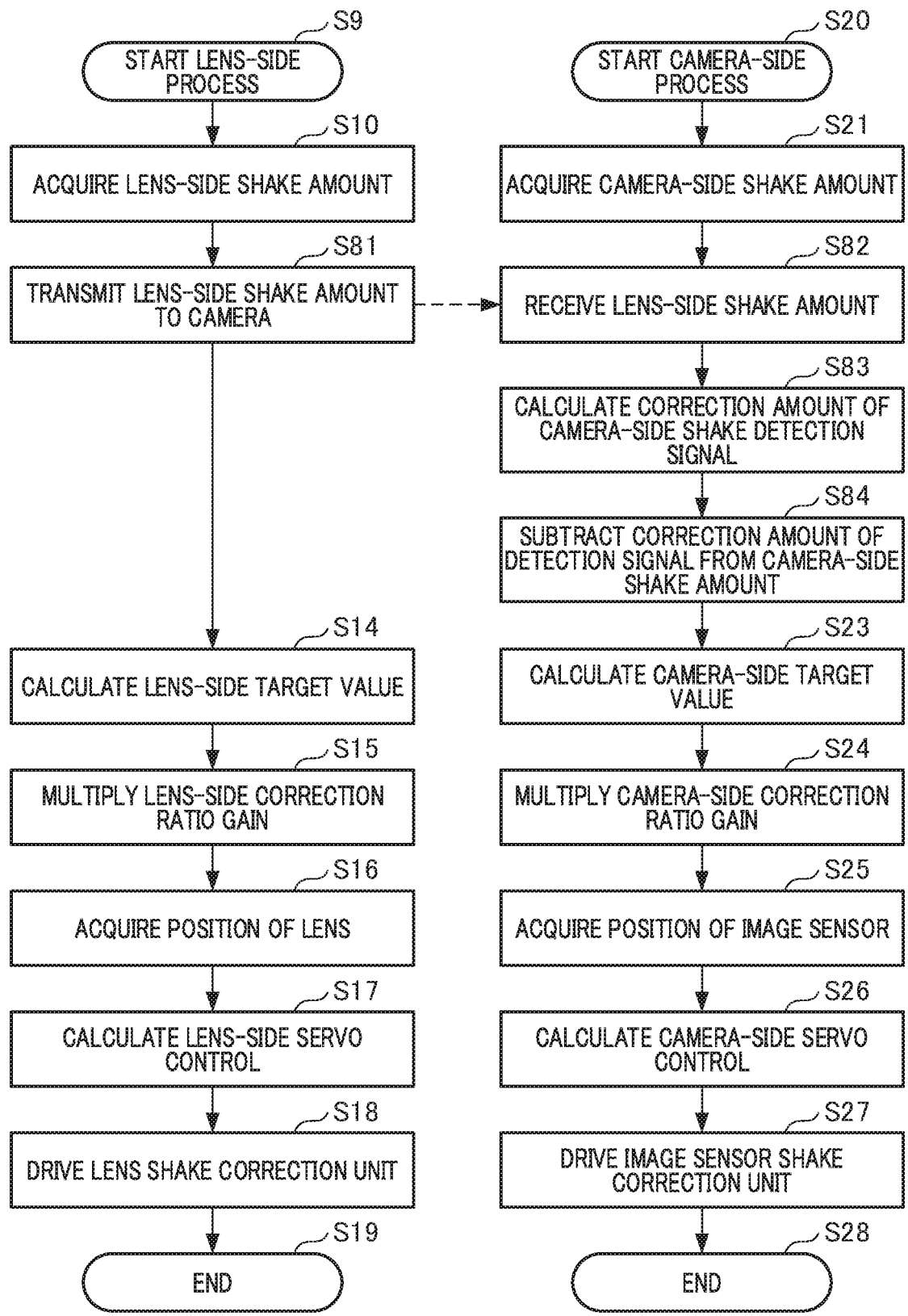
FIG. 13 is a flowchart illustrating image blur correction according to the second embodiment.

FIG. 13 is a flowchart illustrating an image blur correction process by the lens control unit 15 and the camera control unit 5 according to the embodiment. Differences from FIG. 6 are as follows.

Each step of S11 (the reception of the camera-side shake amount), S12 (the calculation of the correction amount of the lens-side shake detection signal), and S13 (the subtraction of the correction amount of the detection signal from the lens-side shake amount) is cancelled from the lens-side image blur correction process.

S81 (transmission of a lens-side shake amount to the camera) is added after S10. In the embodiment, the lens shake detection signal is transmitted from the lens control unit 15 to the camera control unit 5.

Steps of S82 to S84 are added between S21 and S23 in the camera-side image blur correction process.

The camera control unit 5 receives a signal of a lens-side shake amount in S82 and subsequently calculates a correction amount of a camera-side shake detection signal in S83. Then, in S84, the camera control unit 5 performs a process of subtracting the signal of the correction amount from the shake detection signal indicating the camera-side shake amount.

In the embodiment, it is assumed that the low-frequency shake detection performance of the camera shake detection unit 12 is lower than the low-frequency shake detection performance of the lens shake detection unit 17. When the correction unit 701 supplements the low-frequency component of the camera shake detection signal with the low-frequency component of the lens shake detection signal, it is possible to realize an improvement in the image blur correction performance.

Modification Example of Second Embodiment

Figure 14A:
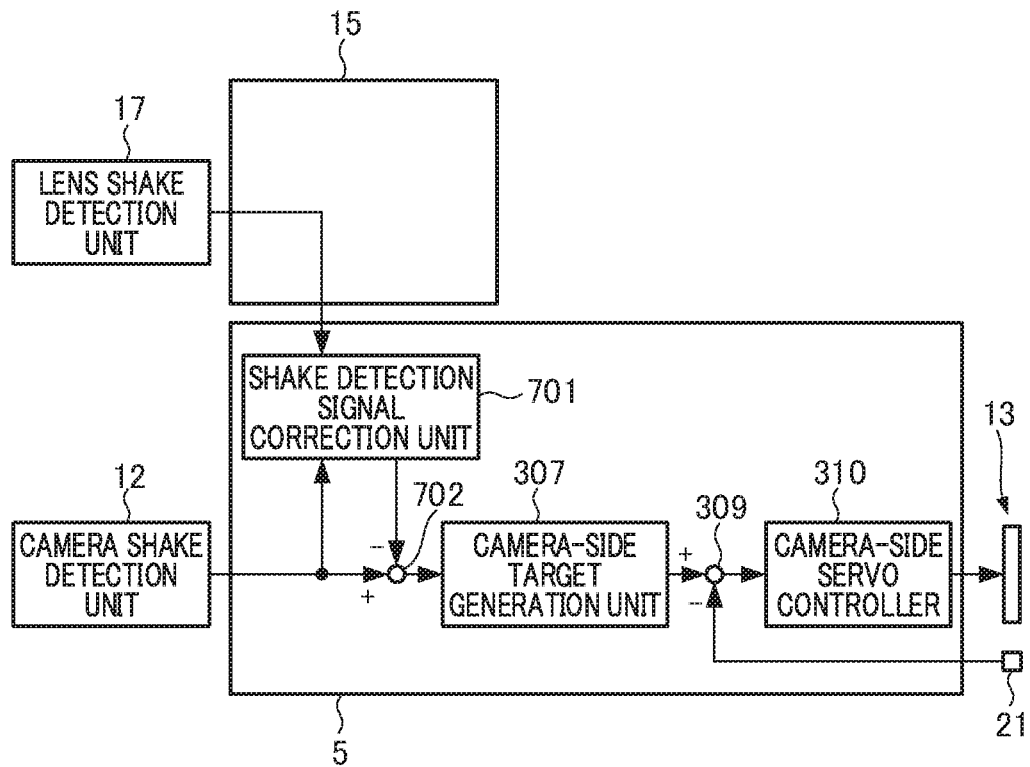
FIGS. 14A and 14B are block diagrams illustrating configurations according to modification examples of the second embodiment.

A modification example of the second embodiment will be described with reference to FIGS. 14A and 14B. Differences between the configurations illustrated in FIGS. 14A and 11 are that the imaging system includes only the image sensor shake correction unit 13 and does not include the lens shake correction unit 18. In this case, the camera control unit 5 includes the shake detection signal correction unit 701 and only the image sensor shake correction unit 13 performs image blur correction. Therefore, the correction ratio gain unit 308 that determines a correction ratio is not provided.

Figure 14B:
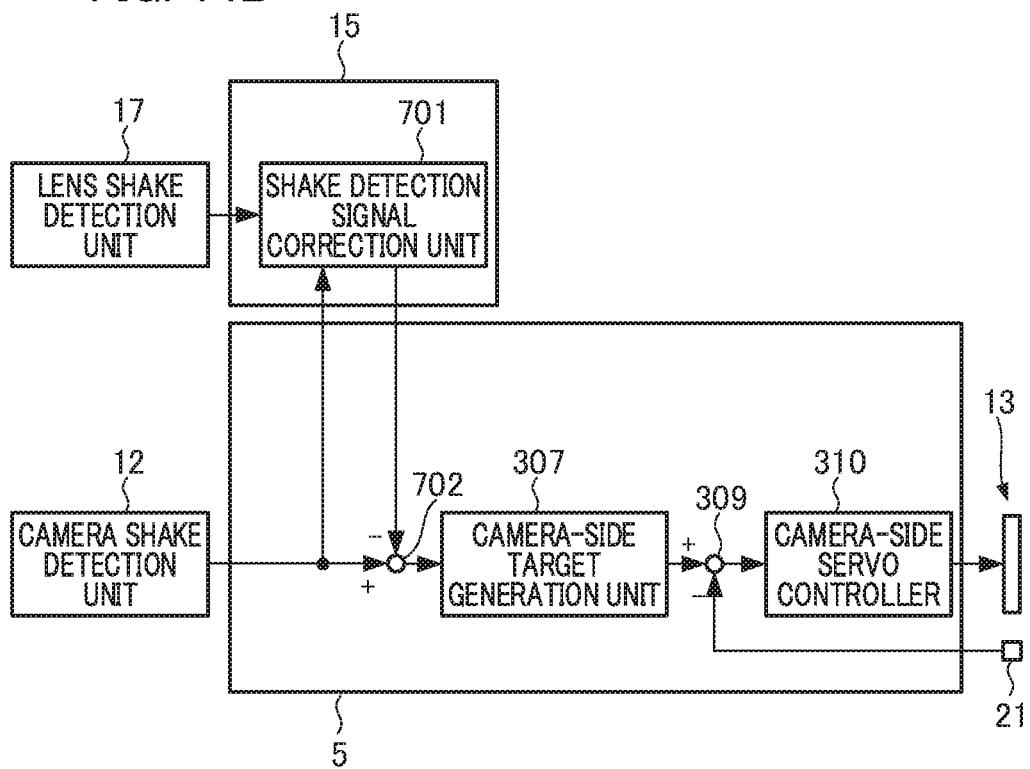

FIG. 14B illustrates an example in which the body unit includes the image sensor shake correction unit 13 similarly to FIG. 14A and the lens control unit 15 includes the shake detection signal correction unit 701. As in the modification example of the first embodiment, depending on a restriction on a processing load or a processing capability of the camera control unit 5, the point that the lens control unit 15 includes the correction unit 701 is effective. Here, in this case, it is necessary for the lens control unit 15 to acquire the camera shake detection signal from the camera control unit 5 through communication, calculate a correction amount of the shake detection signal, and transmit the correction amount to the camera control unit 5. Therefore, the camera control unit 5 and the lens control unit 15 perform a process of taking countermeasures against an influence of a delay time due to communication.

According to the modification example, even when the imaging system including the body unit and the lens device that each include the shake detection unit does not include a plurality of shake correction members, it is possible to improve the image blur correction performance.

Third Embodiment

An imaging device according to an embodiment will be described with reference to FIGS. 15 to 17. In the embodiment, it is assumed that the low-frequency shake detection performance of the lens shake detection unit 17 is lower than the low-frequency shake detection performance of the camera shake detection unit 12 as in the first embodiment. That is, the shake detection signal correction unit 306 is configured to supplement the low-frequency component of the lens shake detection signal with the low-frequency component of the camera shake detection signal. Based on target signals calculated from the lens shake detection signal and the camera shake detection signal, the lens shake correction unit 18 and the image sensor shake correction unit 13 are driven. The embodiment is different from the first embodiment in that a unit performing correction when an error occurs in a correction target position inversely calculated from an actual position of the shake correction member is included.

Figure 15:
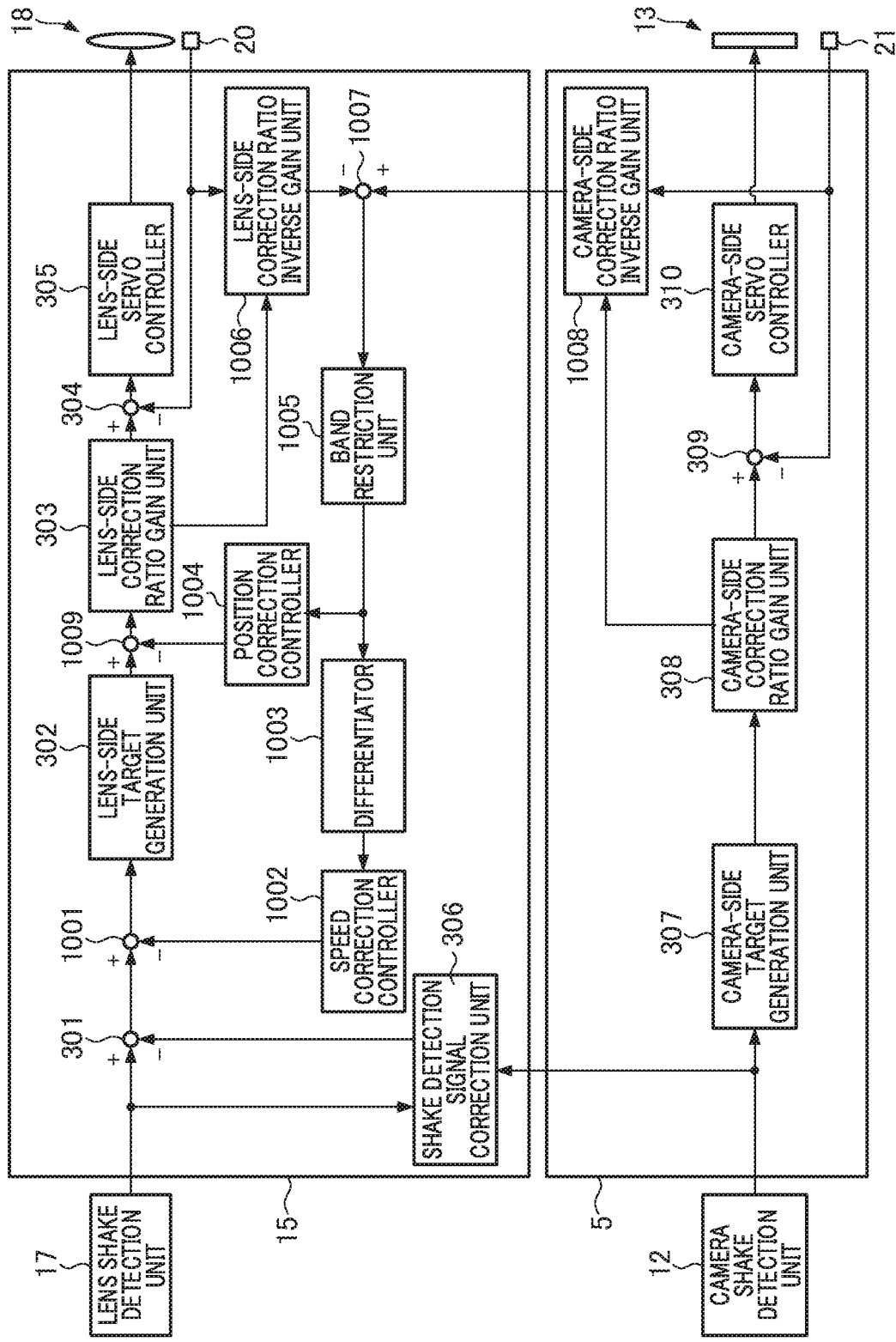
FIG. 15 is a block diagram illustrating a configuration of an image blur correction control unit according to a third embodiment.

FIG. 15 is a block diagram illustrating a detailed configuration related to image blur correction performed by the lens control unit 15 and the camera control unit 5 according to the embodiment. Each of the configurations of the lens control unit 15 and the camera control unit 5 related to the image blur correction may be realized as a signal processing device. Differences from FIG. 2 are as follows.

An adder 1001 is disposed between the adder 301 and the target generation unit 302.

An adder 1009 is disposed between the target generation unit 302 and the correction ratio gain unit 303.

A lens-side correction ratio inverse gain unit 1006 and an adder 1007 are provided.

A speed correction controller 1002, a differentiator 1003, a position correction controller 1004, and a band restriction unit 1005 are added.

These constituent elements are configured inside the lens control unit 15.

A correction ratio inverse gain unit 1008 is provided inside the camera control unit 5.

A position correction process of the shake correction member in the imaging device that has the above configuration will be described. First, the lens control unit 15 acquires a shake detection signal from the lens shake detection unit 17. The adder 301 subtracts the signal of the correction amount calculated by the correction unit 306 from the acquired shake detection signal and outputs a subtraction result to the adder 1001.

The adder 1001 subtracts the output of the speed correction controller 1002 to be described below from the output of the adder 301 and outputs a subtraction result to the target generation unit 302. The target generation unit 302 causes the integrator to perform a process of integrating the output of the adder 1001 and calculates a shake correction amount for the lens shake correction unit 18. The adder 1009 subtracts the position correction amount calculated by the position correction controller 1004 to be described below from the shake correction amount calculated by the target generation unit 302. The correction ratio gain unit 303 multiplies the output of the adder 1009 by a gain corresponding to the correction ratio and outputs a signal of the shake correction target value of a predetermined ratio to the adder 304.

The adder 304 subtracts the position detection signal by the lens position detection unit 20 from the signal of the shake correction target value and outputs a subtraction result to the lens-side servo controller 305. The lens-side servo controller 305 generates a driving signal to be given to the lens shake correction unit 18 and drives the correction lens. In this way, a shake amount of a predetermined ratio determined by the correction ratio gain unit 303 to the shake amount detected by the lens shake detection unit 17 is corrected by the lens shake correction unit 18.

On the other hand, the camera control unit 5 acquires the shake detection signal from the camera shake detection unit 12. The target generation unit 307 calculates a shake correction amount for the image sensor shake correction unit 13 by causing the integrator to integrate the shake detection signal. The correction ratio gain unit 308 multiples the shake correction amount calculated by the target generation unit 307 by the gain corresponding to the correction ratio and outputs the signal of the shake correction target value of the predetermined ratio to the adder 309.

The adder 309 subtracts the position detection signal by the image sensor position detection unit 21 from the signal of the shake correction target value and outputs a subtraction result to the camera-side servo controller 310. The servo controller 310 generates a driving signal to be given to the image sensor shake correction unit 13 based on the output of the adder 309 and drives the image sensor 6. In this way, a shake amount of a predetermined ratio determined by the correction ratio gain unit 308 to the shake amount detected by the camera shake detection unit 12 is corrected by the shake correction unit 13.

So far, the case in which each of the lens shake detection unit 17 and the camera shake detection unit 12 detects shake of the imaging device correctly to the same degree has been assumed. In this case, by simultaneously driving the lens shake correction unit 18 and the image sensor shake correction unit 13 at a predetermined ratio, it is possible to perform image blur correction satisfactorily. In the actual imaging system, however, depending on a combination of the interchangeable lens 2 and the body unit, a difference in the detection performance between the lens shake detection unit 17 and the camera shake detection unit 12 is equal to or greater than a threshold in some cases. In this case, the shake detection signal correction unit 306 performs correction on a detection performance difference between the plurality of shake detection units. However, practically, there is concern of a lens-side target value not precisely disagreeing with a camera-side target value due to a factor such as a calculation error of a target value calculation process at the rear stage. When a calculation error of the target value of the image blur correction exceeds an allowable error, a problem arises in that satisfactory image blur correction may not be performed without driving the shake correction units at a pre-decided ratio when the plurality of shake correction units are simultaneously driven.

Accordingly, in the embodiment, the following control is performed. First, the camera-side correction ratio inverse gain unit 1008 acquires a position detection signal by the position detection unit 21 of the image sensor 6. Information included in the position detection signal is information corresponding to a signal which is multiplied by a gain of a predetermined ratio by the camera-side correction ratio gain unit 308. The correction ratio inverse gain unit 1008 calculates a reciprocal of a gain value of the correction ratio gain unit 308, multiplies the position detection signal by the reciprocal, and transmits a multiplication result to the lens control unit 15. The lens control unit 15 acquires an output signal of the correction ratio inverse gain unit 1008 through communication via the electrical contact point 14, and then the signal is input to the adder 1007.

The lens-side correction ratio inverse gain unit 1006 acquires the position detection signal by the lens position detection unit 20 and calculates a reciprocal of the gain value of the correction ratio gain unit 303. The correction ratio inverse gain unit 1006 multiplies the position detection signal by the lens position detection unit 20 by the reciprocal and outputs a multiplication result to the adder 1007. In the lens control unit 15, the adder 1007 performs a process on output signals of the correction ratio inverse gain units 1006 and 1008. The adder 1007 subtracts the output of the lens-side correction ratio inverse gain unit 1006 from the output of the camera-side correction ratio inverse gain unit 1008 and outputs a signal of a difference value to the band restriction unit 1005.

The band restriction unit 1005 restricts an output of the adder 1007 to a signal with a predetermined frequency band. The band restriction unit 1005 includes a lowpass filter that extracts a low-frequency component from an input signal or a bandpass filter that extracts a specific frequency component. The signal with the restricted band is input to the position correction controller 1004 and the differentiator 1003.

The position correction controller 1004 calculates a position correction amount based on an output of the band restriction unit 1005 and outputs the position correction amount to the adder 1009. The position correction controller 1004 can be realized using a feedback controller through proportional control, integral control, or the like. The adder 1009 subtracts the position correction amount from the output of the target generation unit 302 and outputs a subtraction result to the correction ratio gain unit 303. The position correction amount is a correction amount calculated from a value obtained by restricting a band of a position difference corresponding to a difference between a shake correction amount for the lens shake correction unit 18 and a shake correction amount for the image sensor shake correction unit 13 from a band-restricted value.

The differentiator 1003 performs differential calculation on an output of the band restriction unit 1005 to calculate a difference value between shake correction speeds. The speed correction controller 1002 calculates a speed correction amount from a difference value between the shake correction speeds by the differentiator 1003 and outputs the speed correction amount to the adder 1001. The speed correction controller 1002 can be realized using a feedback controller through proportional control and integral control.

The adder 1001 subtracts a speed correction amount by the speed correction controller 1002 from the output of the adder 301. The speed correction amount is a correction amount calculated from a value obtained by performing band-restriction and differentiation on a position difference corresponding to a difference between the shake correction amount for the lens shake correction unit 18 and the shake correction amount for the image sensor shake correction unit 13.

In the embodiment, the position correction amount calculated by the position correction controller 1004 so that a difference value between the shake correction amounts is zero is fed back via the adder 1009. Further, the speed correction controller 1002 feeds back the speed correction amount calculated so that the difference value between the shake correction speeds is zero via the adder 1001. The shake correction amount calculated based on the lens shake detection signal and output from the adder 1009 accords with the shake correction amount calculated based on the camera shake detection signal, or is corrected so that a difference between both the shake correction amounts is reduced.

In the embodiment, the configurations in which the position correction controller 1004 and the speed correction controller 1002 are used have been described, but only one of the configurations may be used in an embodiment. Even when correction amounts corresponding to target signals calculated by the lens-side target generation unit 302 and the camera-side target generation unit 307 deviate due to a characteristic difference between the lens shake detection unit 17 and the camera shake detection unit 12, the correction controller corrects the correction amounts so that both the correction amounts agree with each other. Accordingly, it is possible to perform image blur correction satisfactorily when the lens shake correction unit 18 and the image sensor shake correction unit 13 are simultaneously driven. The speed correction controller 1002, the differentiator 1003, the position correction controller 1004, the band restriction unit 1005, and the adders 1001, 1007, and 1009 can be provided inside the camera control unit 5 to correct a deviation between the correction amounts corresponding to the target signals.

Next, only differences from the first embodiment will be described with regard to the image blur correction process according to the embodiment with reference to the flowcharts of FIGS. 16 and 17. In a lens-side image blur correction operation, in S1101, the adder 1001 subtracts the speed correction amount calculated by the speed correction controller 1002 from the lens shake detection signal after the subtraction of the correction amount calculated in S13. In S1102, the adder 1009 subtracts the position correction amount calculated by the position correction controller 1004 from the shake correction amount calculated in S14 by the target generation unit 302.

The correction ratio inverse gain unit 1006 calculates the shake correction amount based on the lens shake detection signal by multiplying the position detection signal of the correction lens by an inverse gain of the lens-side correction ratio in S1103 after S18 of FIG. 17. Further, in S1104, the lens control unit 15 receives an output signal of the correction ratio inverse gain unit 1008 transmitted from the camera control unit 5 through communication.

In S1105, the adder 1007 calculates an error between the lens-side and camera-side shake correction amounts acquired in S1103 and S1104. In S1106, the position correction controller 1004 calculates a position correction amount with which the error bet the shake correction amounts is zero and outputs the position correction amount to the adder 1009. The adder 1009 subtracts the position correction amount from the target generation unit 302 (see FIG. S1102).

In S1107, the differentiator 1003 calculates a differential value of the error of the position correction amount calculated in S1106, that is, a speed error of the shake correction amount. Further, in S1108, the speed correction controller 1002 calculates a speed correction amount so that the speed error is zero and outputs the speed correction amount to the adder 1001. The adder 1001 subtracts the speed correction amount from the output of the adder 301 (see S1101). Thereafter, the process moves to S19.

Figure 16:
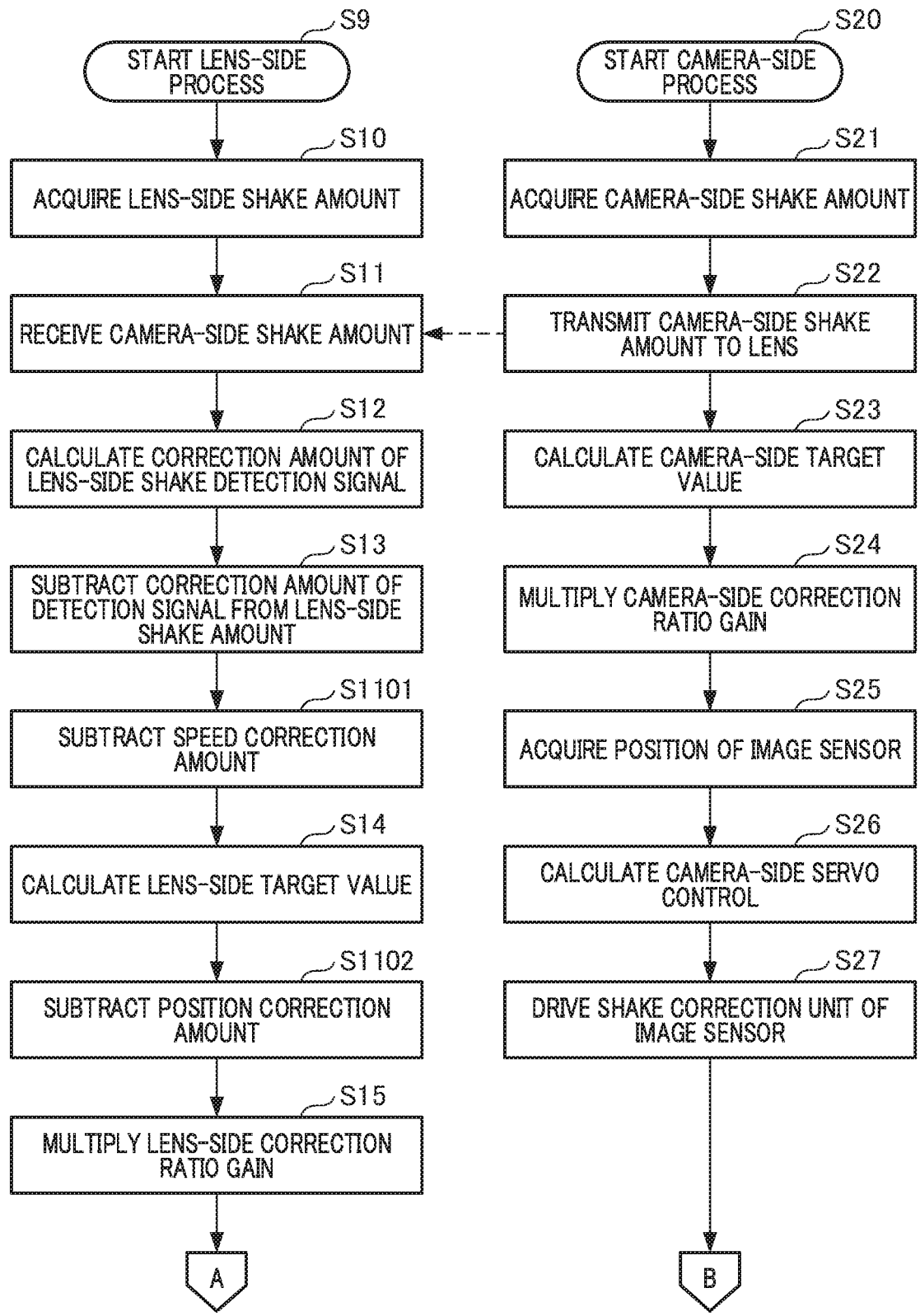
FIG. 16 is a flowchart illustrating image blur correction according to the third embodiment.

On the other hand, in the camera-side image blur correction operation, the process moves to S1109 of FIG. 17 after S27 of FIG. 16. In S1109, the correction ratio inverse gain unit 1008 multiplies the position detection signal of the image sensor 6 by an inverse gain of a camera-side correction ratio to calculate a shake correction amount based on the camera shake detection signal. In S1110, the camera control unit 5 transmits an output signal of the correction ratio inverse gain unit 1008 to the lens control unit 15. Thereafter, the process moves to S28.

As described above, the lens shake correction amount agrees with the camera shake correction amount or a difference between the shake correction amounts is corrected to be reduced in accordance with the position correction amount and the speed correction amount. Therefore, even when the shake detections units with different detection performance are used, a deviation between the shake correction amounts can be corrected. According to the embodiment, in addition to the advantages of the first embodiment, it is possible to correct a deviation in the correction target position when the lens shake correction unit 18 and the image sensor shake correction unit 13 are simultaneously driven.

In the foregoing embodiment, a process of correcting any shake detection signal in accordance with a correction amount with which the difference between the plurality of shake detection signals in the imaging system is reduced is performed. Accordingly, even when there is a performance difference between the shake detection units included in both the interchangeable lens and the body unit, it is possible to improve the image blur correction performance without being affected by a phase delay due to communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-227345, filed Dec. 4 2018, which is hereby incorporated by reference wherein in its entirety.

What is claimed is:

1. A signal processing device comprising:
at least one processor and a memory holding a program which makes the processor function as:
an acquisition unit configured to acquire a first shake detection signal indicating a detection result of a first shake detection unit included in a first device and a second shake detection signal indicating a detection result of a second shake detection unit included in a second device different from the first device; and
a determination unit configured to determine a correction amount which is used to correct the first shake detection signal based on the first shake detection signal and the second shake detection signal,
wherein the determination unit changes a process parameter for determining the correction amount in accordance with information regarding the second shake detection unit or information regarding the second shake detection signal, and the process parameter includes at least one of a restriction frequency and a gain for the correction amount.

2. The signal processing device according to claim 1, wherein the determination unit changes the process parameter in accordance with an acquisition situation of the second shake detection signal.

3. The signal processing device according to claim 2, wherein the determination unit sets the gain to a first value as the process parameter when an acquisition interval of the second shake detection signal is a first interval, and sets the gain to a second value less than the first value when the acquisition interval of the second shake detection signal is a second interval longer than the first interval.

4. The signal processing device according to claim 2, wherein the determination unit sets the restriction frequency to a first value as the process parameter when an acquisition interval of the second shake detection signal is a first interval, and sets the restriction frequency to a second value less than the first value when the acquisition interval of the second shake detection signal is a second interval longer than the first interval.

5. The signal processing device according to claim 1, wherein the determination unit changes the process parameter in accordance with a low-frequency noise amount included in the second shake detection signal.

6. The signal processing device according to claim 5, wherein the determination unit sets the gain to a first value as the process parameter when the low-frequency noise amount is a first noise amount, and sets the gain to a second value less than the first value when the low-frequency noise amount is a second noise amount larger than the first noise amount.

7. The signal processing device according to claim 5, wherein the determination unit sets the restriction frequency to a first value as the process parameter when the low-frequency noise amount is a first noise amount, and sets the restriction frequency to a second value less than the first value when the low-frequency noise amount is a second noise amount larger than the first noise amount.

8. The signal processing device according to claim 1, wherein the determination unit determines the correction amount from which a difference between the first and second shake detection signals is reduced.

9. The signal processing device according to claim 1, wherein the determination unit determines the correction amount through proportional control or integral control using a difference signal between a signal obtained by integrating the first shake detection signal and a signal obtained by integrating the second shake detection signal.

10. The signal processing device according to claim 1, wherein the determination unit changes the process parameter for determining the correction amount in accordance with information regarding the second shake detection unit or information regarding the second shake detection signal when detection performance of the first shake detection unit is lower than detection performance of the second shake detection unit.

11. The signal processing device according to claim 10, wherein the detection performance is determined from a change in a standard value of the shake detection signal with respect to temperature, a change in the standard value of the shake detection signal in a stationary state, or a change amount of the shake detection signal for a time decided in advance in the stationary state.

12. The signal processing device according to claim 1, wherein the first device is a lens device and the second device is an imaging device.

13. A control method for a signal processing device, the method comprising:
   acquiring a first shake detection signal indicating a detection result of a first shake detection unit included in a first device and a second shake detection signal indicating a detection result of a second shake detection unit included in a second device different from the first device;
   determining a correction amount which is used to correct the first shake detection signal based on the first shake detection signal and the second shake detection signal; and
   changing a process parameter for determining the correction amount in accordance with information regarding the second shake detection unit or information regarding the second shake detection signal, the process parameter including at least one of a restriction frequency and a gain for the correction amount.

14. A lens device comprising:
   at least one processor and a memory holding a program which makes the processor function as:
   an acquisition unit configured to acquire a first shake detection signal indicating a detection result of a first shake detection unit included in the lens device and a second shake detection signal indicating a detection result of a second shake detection unit included in an imaging device connected to the lens device; and
   a determination unit configured to determine a correction amount which is used to correct the second shake detection signal based on the first shake detection signal and the second shake detection signal,
   wherein the determination unit changes a process parameter for determining the correction amount in accordance with information regarding the first shake detection unit or information regarding the first shake detection signal, and the process parameter includes at least one of a restriction frequency and a gain for the correction amount.

15. An imaging device comprising:
   at least one processor and a memory holding a program which makes the processor function as:
   an acquisition unit configured to acquire a first shake detection signal indicating a detection result of a first shake detection unit included in the imaging device and a second shake detection signal indicating a detection result of a second shake detection unit included in a lens device connected to the imaging device; and
   a determination unit configured to determine a correction amount which is used to correct the second shake detection signal based on the first shake detection signal and the second shake detection signal,
   wherein the determination unit changes a process parameter for determining the correction amount in accordance with information regarding the first shake detection unit or information regarding the first shake detection signal, and the process parameter includes at least one of a restriction frequency and a gain for the correction amount.

* * * * *